(12) United States Patent
Oami

(10) Patent No.: US 12,087,040 B2
(45) Date of Patent: *Sep. 10, 2024

(54) INFORMATION PROCESSING DEVICE, INFORMATION PROCESSING METHOD, AND PROGRAM RECORDING MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,699

(22) Filed: Aug. 16, 2023

(65) Prior Publication Data

US 2023/0394796 A1 Dec. 7, 2023

Related U.S. Application Data

(63) Continuation of application No. 17/601,747, filed as application No. PCT/JP2019/017560 on Apr. 25, 2019.

(51) Int. Cl.
*G06V 10/771* (2022.01)
*G06T 7/246* (2017.01)
(Continued)

(52) U.S. Cl.
CPC ............ *G06V 10/771* (2022.01); *G06T 7/246* (2017.01); *G06T 7/73* (2017.01); *G06V 10/44* (2022.01);
(Continued)

(58) Field of Classification Search
CPC .. G06T 7/20; G06T 7/246; G06T 7/70; G06T 7/73; G06V 10/40; G06V 10/44; G06V 10/75; G06V 10/751; G06V 10/771
See application file for complete search history.

(56) References Cited

U.S. PATENT DOCUMENTS

2012/0093364 A1 4/2012 Sato
2015/0227806 A1 8/2015 Oami
(Continued)

FOREIGN PATENT DOCUMENTS

JP 2011-170684 A 9/2011
JP 2016-015043 A 1/2016
(Continued)

OTHER PUBLICATIONS

International Search Report for PCT Application No. PCT/JP2019/017560, mailed on Jul. 16, 2019.
(Continued)

*Primary Examiner* — Andrew W Johns

(57) ABSTRACT

In order to extract a feature suitable for comparison, the information processing device according to the present invention comprises: a prediction unit which, on the basis of the positional relationship between a plurality of objects detected and tracked in an input video and on the basis of the overlap between the plurality of objects, predicts the qualities of features extracted from the objects; a selection unit which selects, from among the plurality of objects, only those objects or that object for which the qualities of features predicted by the prediction unit satisfy a prescribed condition; and a feature extraction unit which extracts features from the objects or the object selected by the selection unit.

10 Claims, 21 Drawing Sheets

(51) Int. Cl.
  *G06T 7/73*     (2017.01)
  *G06V 10/44*    (2022.01)
  *G06V 10/75*    (2022.01)
(52) U.S. Cl.
  CPC .. *G06V 10/751* (2022.01); *G06T 2207/10016* (2013.01)

(56) References Cited

U.S. PATENT DOCUMENTS

| | | | |
|---|---|---|---|
| 2018/0197000 A1 | 7/2018 | Ogura et al. | |
| 2018/0373307 A1* | 12/2018 | Zhang et al. | G06F 1/3246 |
| 2019/0197321 A1* | 6/2019 | Hughes et al. | G06V 40/10 |

FOREIGN PATENT DOCUMENTS

| | | | |
|---|---|---|---|
| JP | 2018-045287 A | 3/2018 | |
| JP | 2018-106236 A | 7/2018 | |
| WO | 2014/045479 A1 | 3/2014 | |
| WO | 2017/006749 A1 | 1/2017 | |

OTHER PUBLICATIONS

English translation of Written opinion for PCT Application No. PCT/JP2019/017560, mailed on Jul. 16, 2019.

* cited by examiner

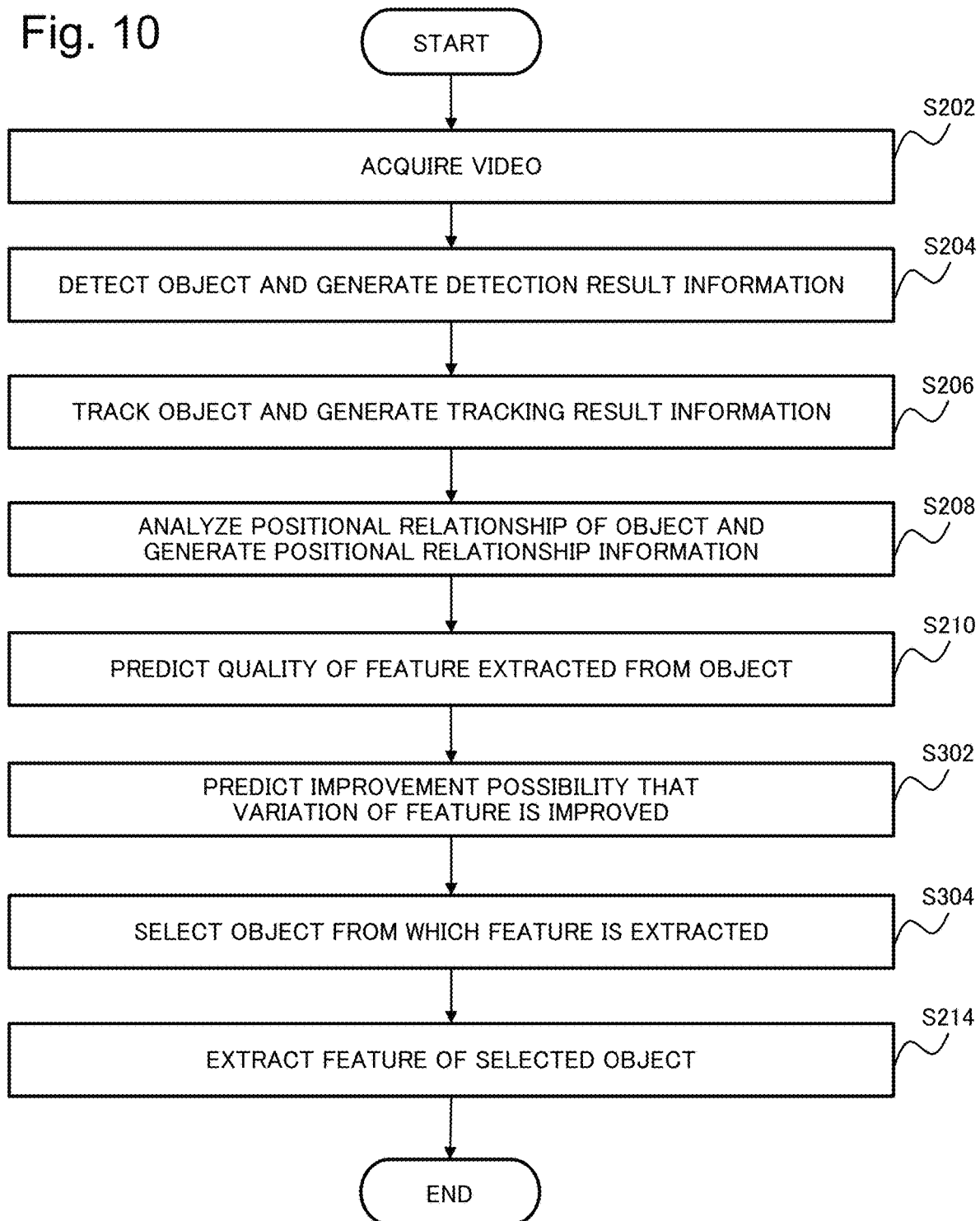

INFORMATION PROCESSING DEVICE, INFORMATION PROCESSING METHOD, AND PROGRAM RECORDING MEDIUM

This application is a Continuation of U.S. application Ser. No. 17/601,747 filed on Oct. 6, 2021, which is a National Stage Entry of PCT/JP2019/017560 filed on Apr. 25, 2019, the contents of all of which are incorporated herein by reference, in their entirety.

TECHNICAL FIELD

The present invention relates to an information processing device, an information processing method, and an information processing program.

BACKGROUND ART

Conventionally, a method of detecting an object (body) such as a person or a car using a camera and extracting features have been proposed. Here, the object refers to an object such as a person, a car, or an animal. The features used to match objects detected between different cameras or to search for the same or similar objects from previously captured and stored videos.

The features extracted from the object vary. In recent years, with progress of deep learning technology, features extracted on the basis of deep learning are increasingly used. The features extracted on the basis of the deep learning contribute to highly accurate matching. On the other hand, in many cases, the features extracted on the basis of the deep learning take time for extraction processing. Therefore, in a case where there are many objects to be extraction targets of features simultaneously appearing in the image, the time required for the feature extraction cannot be ignored. In particular, in a case where processing is performed on each frame of a video under a situation where constraints of calculation resources are severe, processing in real time becomes difficult.

In view of this point, conventionally, there has been proposed a method of selecting an object and extracting the features from only the selected object, instead of extracting the features from all objects appearing in an image.

PTL 1 discloses a method for extracting features of a person. In the method of PTL 1, which person detected in the image the features are to be extracted from is determined with priority according to the size on the basis of the size of the person in the image and the past feature extraction frequency. PTL 1 describes a method of providing a comprehensive selection means for selecting a person from whom features are to be extracted by a random number, alternately performing priority processing and comprehensive processing, and selecting a person to extract features. Further, PTL 1 describes that an orientation of a person is considered when selecting the person from whom the features are extracted.

In a method disclosed in PTL 2, in a case of installation of a normal surveillance camera that captures an image from obliquely above, a lower part of the image is closer to the camera and a person appears large, and thus it is expected that movement of the person in the image increases therein. PTL 2 discloses a method of increasing the frequency of extracting the features of a person toward the lower part of the image. PTL 2 describes that, in consideration of the magnitude of motion of a person, the frequency of feature extraction is increased as the motion of the person is larger.

CITATION LIST

Patent Literature

[PTL 1] WO 2017/006749
[PTL 2] WO 2014/045479

SUMMARY OF INVENTION

Technical Problem

However, since the technique described in PTL 1 considers only the size of a person and the feature extraction frequency, there is a possibility that the feature unsuitable for matching is extracted. In the technique described in PTL 2, since only the position of a person in the image is considered, there is a possibility that the feature unsuitable for matching is extracted.

An object of the present invention is to provide an information processing device, an information processing method, and an information processing program capable of extracting features suitable for matching.

Solution to Problem

An information processing device according to the present invention includes a prediction means for predicting, based on a positional relationship between a plurality of objects detected and tracked in an input video and on an overlap between the plurality of objects, qualities of features to be extracted from the objects, a selection means for selecting, from among the plurality of objects, only objects or an object for which the qualities of features predicted by the prediction means satisfy a predetermined condition, and a feature extraction means for extracting features from the object selected by the selection means.

An information processing method according to the present invention includes predicting, based on a positional relationship between a plurality of objects detected and tracked in an input video and on an overlap between the plurality of objects, qualities of features to be extracted from the objects, selecting, from among the plurality of objects, only objects or an object for which the qualities of features satisfy a predetermined condition, and extracting features from the selected object.

An information processing program according to the present invention causes a computer to execute a prediction processing of predicting, based on a positional relationship between a plurality of objects detected and tracked in an input video and on an overlap between the plurality of objects, qualities of features to be extracted from the objects, a selection processing of selecting, from among the plurality of objects, only objects or an object for which the qualities of features predicted by the prediction processing satisfy a predetermined condition, and a feature extraction processing of extracting features from the object selected by the selection processing.

Advantageous Effects of Invention

According to the present invention, it is possible to extract features suitable for matching.

BRIEF DESCRIPTION OF DRAWINGS

FIG. 10 is a flowchart illustrating processing operation of the information processing device according to the third example embodiment.

EXAMPLE EMBODIMENT

First Example Embodiment

Figure 1:
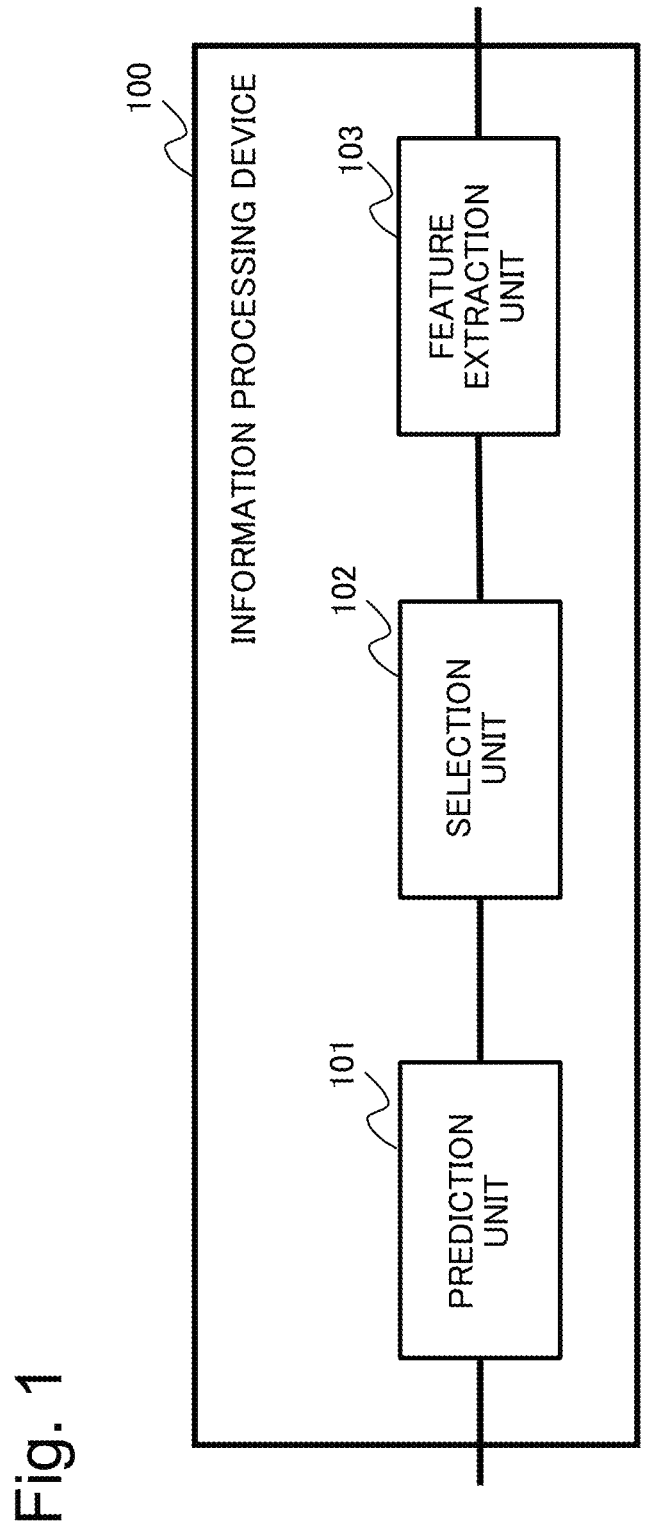
FIG. 1 is a diagram illustrating a configuration of an information processing device according to a first example embodiment.

FIG. 1 is a diagram illustrating a configuration of an information processing device 100 according to the present example embodiment.

The information processing device 100 illustrated in FIG. 1 includes a prediction unit 101, a selection unit 102, and a feature extraction unit 103.

The prediction unit 101 predicts, on the basis of a positional relationship between a plurality of objects detected and tracked in an input video and an overlap between the plurality of objects, qualities of features to be extracted from the objects.

The selection unit 102 selects, from among the plurality of objects, only objects or an object for which the qualities of the features predicted by the prediction unit 101 satisfies a predetermined condition.

The feature extraction unit 103 extracts the features from the object selected by the selection unit 102.

Figure 2:
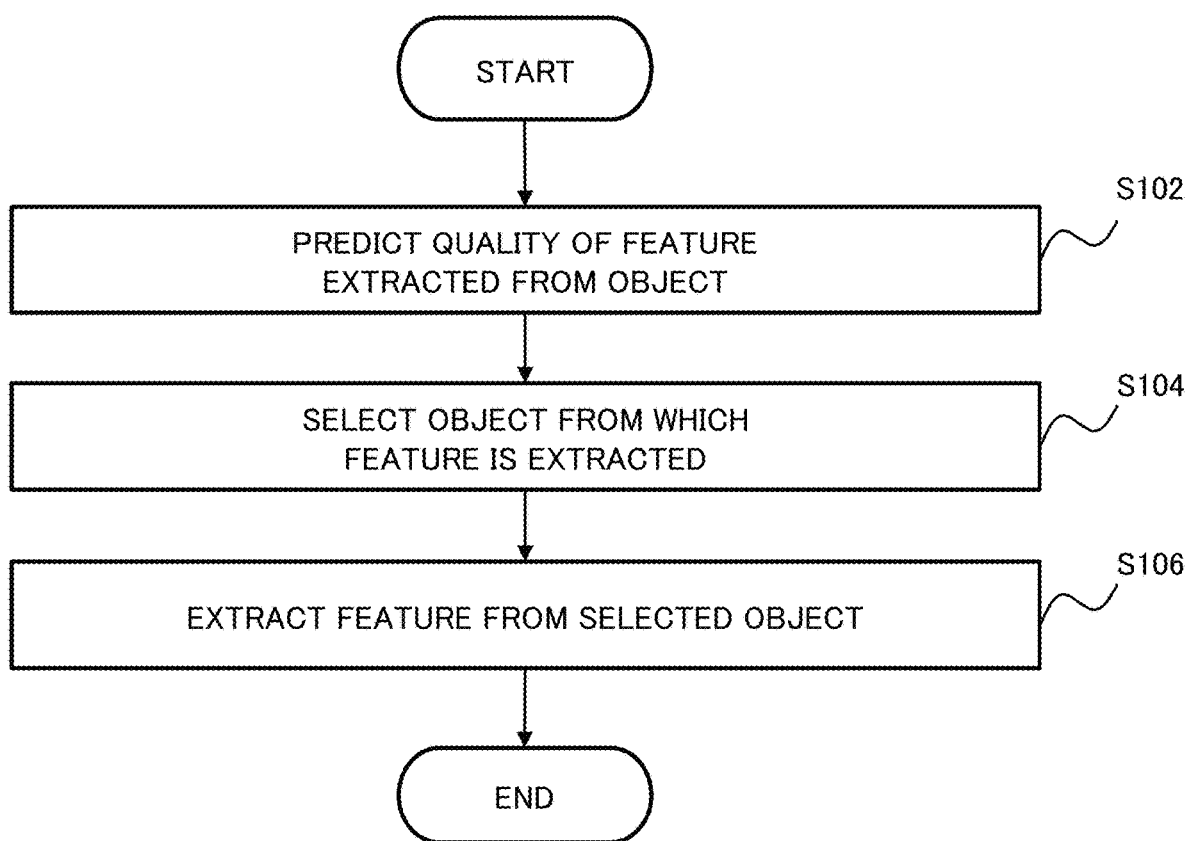
FIG. 2 is a flowchart illustrating processing operation of the information processing device according to the first example embodiment.

FIG. 2 is a flowchart illustrating a flow of processing executed by the information processing device 100 according to the first example embodiment.

In step S102, the prediction unit 101 predicts, on the basis of a positional relationship between a plurality of objects detected and tracked in an input video and an overlap between the plurality of objects, qualities of features to be extracted from the objects.

In step S104, the selection unit 102 selects only objects or an object for which the qualities of the features predicted by the prediction unit 101 in step S102 satisfies a predetermined condition from among the plurality of objects.

In step S106, the feature extraction unit 103 extracts the features from the object selected by the selection unit 102 in step S104. After extracting the features, the information processing device 100 ends the processing.

As described above, the information processing device according to the present example embodiment can extract the features suitable for matching. The information processing device according to the present example embodiment selects objects or an object to be subjected to feature extraction even in a situation where a large number of objects are shown in an image, and can achieve extraction of the features that enable highly accurate matching of the objects as a whole while suppressing the cost required for the feature extraction processing.

Second Example Embodiment

Figure 3:
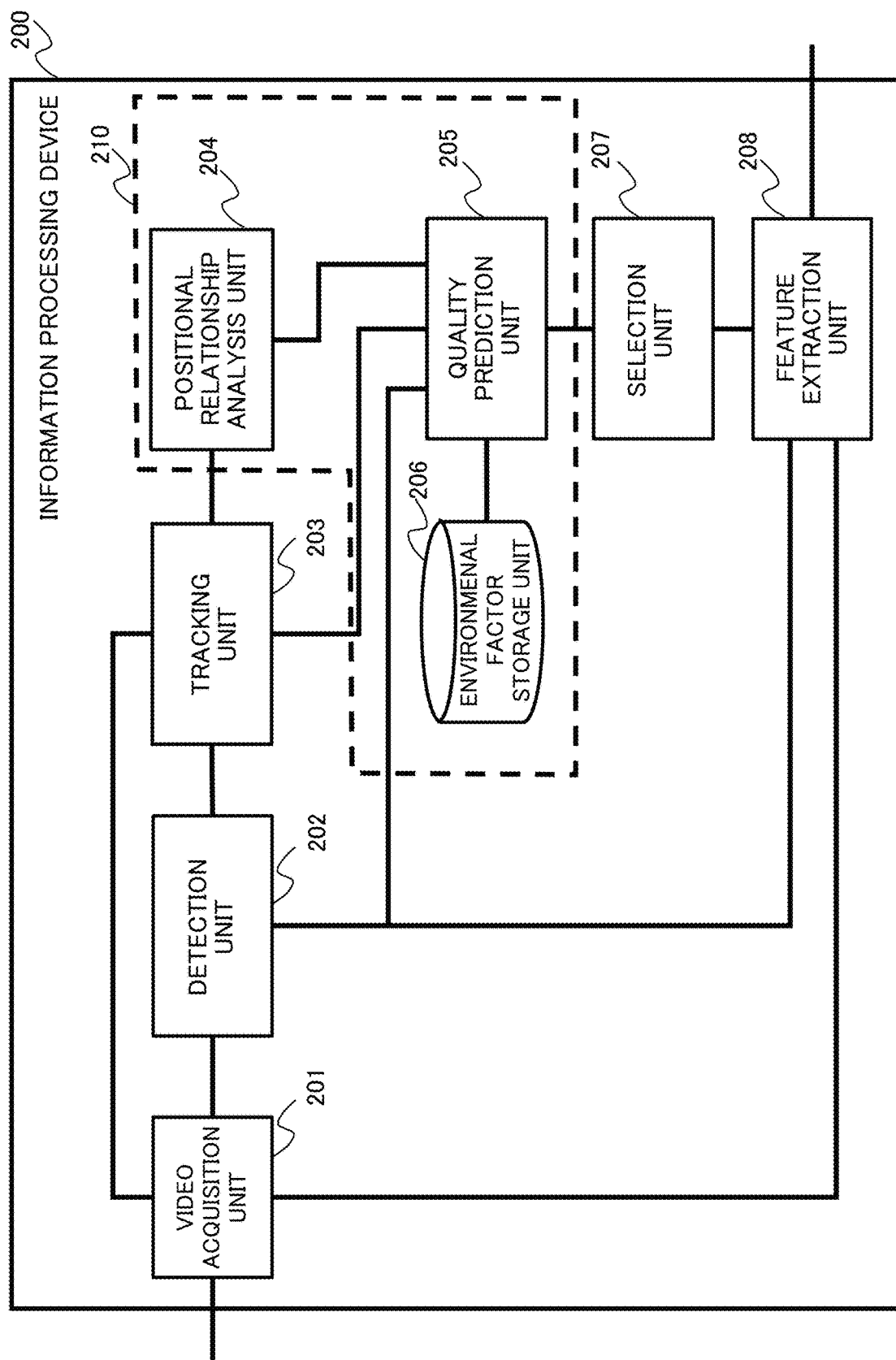
FIG. 3 is a diagram illustrating a configuration of an information processing device according to a second example embodiment.

FIG. 3 is a diagram illustrating a configuration of an information processing device 200 according to the present example embodiment.

The information processing device 200 illustrated in FIG. 3 includes a video acquisition unit 201, a detection unit 202, a tracking unit 203, a prediction unit 210, a selection unit 207, and a feature extraction unit 208.

The prediction unit 210 includes a positional relationship analysis unit 204, a quality prediction unit 205, and an environmental factor storage unit 206.

The video acquisition unit 201 acquires a video captured by an imaging device such as one or more cameras (not illustrated). The imaging device captures a video of an area or an object to be a surveillance target. Here, the imaging device may be any device as long as the device can capture a video. For example, the imaging device is a fixed surveillance camera, a web camera, a camera attached to a mobile body such as an unmanned aerial vehicle (UAV) or a vehicle, a body-worn camera attached to a police officer or a security guard, or a video camera captured by the user.

The video acquisition unit 201 outputs the acquired video as a video sequence to the detection unit 202, the tracking unit 203, and the feature extraction unit 208.

The detection unit 202 detects an object from the video output by the video acquisition unit 201, and outputs a detection result as detection result information. When the object is a person, the detection unit 202 detects a person region using a detector that has learned image features of the person. For example, the detection unit 202 may use a detector that detects on the basis of histograms of oriented gradients (HOG) features or a detector that directly detects from an image using a convolutional neural network (CNN). Alternatively, the detection unit 202 may detect the person using a detector in which a partial region (for example, the head or the like) of the person is learned instead of the entire person. For example, the detection unit 202 specifies the person region by detecting the head position and the foot position using a detector that has learned the head and the feet. For example, the detection unit 202 may be configured to obtain the person region by combining silhouette information (information of a region having a difference from a background model) obtained by the background difference and the head detection information. For example, when the object is a car, the detection unit 202 detects the vehicle using a detector that has learned image features of the vehicle. In a case where the object is a specific object other than a person or a vehicle, as the detection unit 202, it is only required to construct and use a detector that has learned image features of the specific object.

The detection unit 202 generates detection result information from information of the detected object. The detection result information includes information for specifying a frame such as time information or a frame number of the frame and information of the detected object. The information of the object includes a detection position and a size of the object. The detection unit 202 may represent the detection position of the object by a position on the image, or may represent the detection position by a position converted into real world coordinates by using a parameter representing the position or pose of the camera obtained by camera calibration. For example, in a case where the detection position of the object is represented by a position on the image, the detection unit 202 represents the detection position by coordinates of vertices of a rectangle surrounding the object (for example, upper left and lower right vertices). The detection unit 202 may represent the detection position of the object by one vertex and the width and height of a rectangle. In a case where a plurality of objects is detected, the detection result information includes information of the plurality of objects detected in the generated detection result information, and includes an identifier for distinguishing the detection objects in the same frame. The identifier is ID information allocated to distinguish a plurality of objects detected in the same frame, and is different from an identifier allocated to the tracking target object.

The detection unit 202 outputs detection result information to the tracking unit 203, the quality prediction unit 205, and the feature extraction unit 208.

The tracking unit 203 performs tracking processing called tracking by detection on the basis of the detection result information. That is, the tracking unit 203 obtains that each tracking target object included in the information of tracking result of the objects up to the previous time is associated with which detection object included in the detection result information of the current time, and updates the tracking result. The tracking unit 203 may predict the position of the tracking target object by a Kalman filter or a particle filter and associate the position with the detection object at the current time.

In a case where the tracking target object and the detection object are associated with each other, the tracking unit 203 updates the information of the tracking target object by using the information of the associated detection object and the image at the time. In a case where the detection object cannot be associated with any tracking target object, there is a high possibility that the detection object is a newly appeared object, and thus the tracking unit 203 newly generates a tracking target object corresponding to the detection object and adds the tracking target object to the object tracking result.

In a case where the tracking target object cannot be associated with any detection object, the tracking unit 203 determines that the tracking target object has disappeared due to, for example, the fact that the tracking target object has gone out of the image. Thus, the tracking unit 203 deletes the tracking target object from the tracking result. However, the tracking unit 203 may delete the tracking target object after non-correspondence continues several times, instead of deleting it by one non-correspondence. For example, in the process of deleting the tracking target object from the tracking result, the tracking unit 203 may use a likelihood indicating a predetermined certainty of the tracking target object. In this case, the tracking unit 203 increases the likelihood in a case where association with the detection object is succeeded, or decreases the likelihood in a case where association is failed, from the time when the tracking target object has been newly generated. The tracking unit 203 deletes the tracking target object from the tracking result when the likelihood falls below a certain value. In the calculation of the likelihood, the tracking unit 203 may consider not only information indicating whether association with the detection result has been succeeded, but also the certainty at the time of association. The tracking unit 203 generates tracking result information at the current time.

The tracking result information includes the position and size of the object on the image, an identifier given for each tracking target object, and an identifier of the associated detection object. The tracking result information includes information indicating that the detection object is not associated when the detection object has not been associated. The tracking unit 203 uses any method for a description method of the position information, and indicates position information by, for example, circumscribed rectangle information of the tracking object. In a case where the position information is represented by a position on the image, the tracking unit 203 may represent the position information by coordinates of vertices of a rectangle surrounding the object (for example, upper left and lower right vertices). The tracking unit 203 may represent the position information with information of one vertex and a width and a height of the rectangle. The tracking unit 203 may convert coordinates on the image into coordinates on the real space and output the position information. For example, the tracking unit 203 obtains coordinates of one point in the tracking object region, and represents size information with relative information based on the point.

The tracking unit 203 outputs the generated tracking result information to the positional relationship analysis unit 204 and the quality prediction unit 205.

The positional relationship analysis unit 204 compares the position information of each object included in the input tracking result information, and analyzes the positional relationship between tracking target objects. Specifically, the positional relationship analysis unit 204 determines whether the objects overlap each other and, when the objects overlap, determines which object is on a near side, and generates the object positional relationship information. For example, the positional relationship analysis unit 204 determines whether there is an overlap between circumscribed rectangles of the tracking target objects as the determination of overlap. At this time, the positional relationship analysis unit 204 may calculate not only whether there is an overlap but also an overlap ratio indicating a degree of overlap. In determining whether the object is on the near side, the positional relationship analysis unit 204 determines that the object appearing closer to a lower side is on the near side in a case of the angle of view of the typical surveillance camera that captures an image from obliquely above. Thus, in a case where the overlap is determined, the positional relationship analysis unit 204 determines that the object positioned on a lowest side is the object on the near side from the circumscribed rectangle on the image and the position information, and determines that the other object is hidden. The positional relationship analysis unit 204 may convert the position information of the object into real world coordinates and determine the object closest to the camera as the object on the near side. The positional relationship analysis unit 204 may determine the overlap for each part of the object instead of the entire object. For example, the positional relationship analysis unit 204 may divide the circumscribed rectangle of the object into a plurality of regions and determine the overlap for each of the divided regions. The positional relationship analysis unit 204 may calculate an overlap ratio for each of the divided regions.

The positional relationship analysis unit 204 outputs the generated object positional relationship information to the quality prediction unit 205.

The detection result information, the tracking result information, and the object positional relationship information at the current time are input to the quality prediction unit 205. The quality prediction unit 205 calculates a quality index which is an index used for determining which object of the tracking target objects is subjected to the feature extraction processing. The quality prediction unit 205 obtains the quality index on the basis of the input tracking result information, detection result information, object positional relationship information, and the environmental factor information stored in the environmental factor storage unit 206, and outputs the quality index to the selection unit 207.

The quality index is an index for predicting the qualities of the features to be extracted before the features are extracted. The quality index is an index that takes a high value when it is predicted that high-quality features are extracted from the object, and takes a low value otherwise. The value of the quality index can be in any range. Hereinafter, the quality index takes a value in an interval of [0, 1].

The quality prediction unit 205 refers to the object positional relationship information for each tracking target object included in the tracking result information and determines whether occlusion due to overlap with another object has occurred. In a case where the occlusion has occurred, the quality prediction unit 205 predicts that the qualities of the features decrease because part or all of an image region to be subjected to the feature extraction no longer belong to the object, and the features extracted from this region have values different from the original features. Because the degree of the decrease varies depending on the level of occlusion (hereinafter referred to as the degree of occlusion), the quality index is defined to decrease according to the degree of occlusion. The quality prediction unit 205 may set the degree of occlusion as a ratio (occlusion ratio) of a region hidden by the object on the near side in the object region. Assuming that the degree of occlusion is $r_{Occ}$ and the quality index based on the degree of occlusion is $q_{Occ}$, the quality prediction unit 205 calculates the quality index $q_{Occ}$ using Equation 1.

$$q_{Occ} = \theta_{Occ}(r_{Occ})$$ [Equation 1]

Figure 4A:
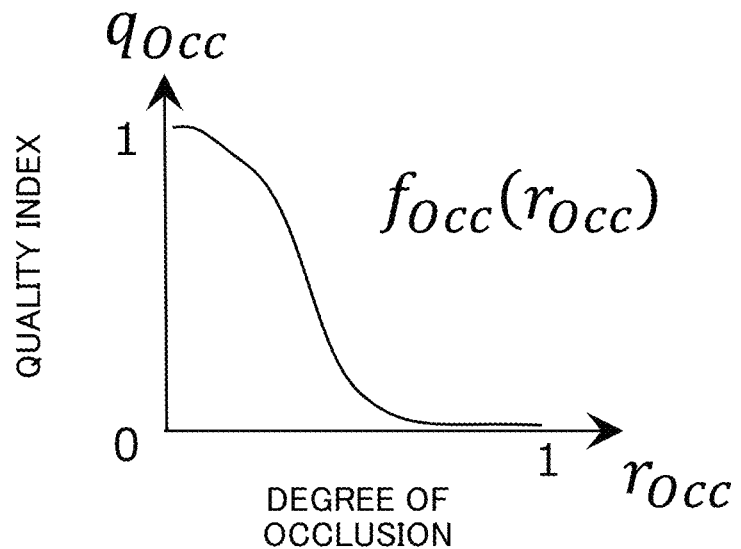
FIG. 4A is a diagram illustrating an example of a function used when calculating a quality index.

Here, $f_{Occ}(r_{Occ})$ is a monotonically non-increasing function having [0, 1] as a value range, and is expressed as in FIG. 4A, for example. The quality prediction unit 205 uses, for example, this function obtained from the relationship between the degree of occlusion and the matching accuracy as $f_{Occ}(r_{Occ})$.

Figure 5:
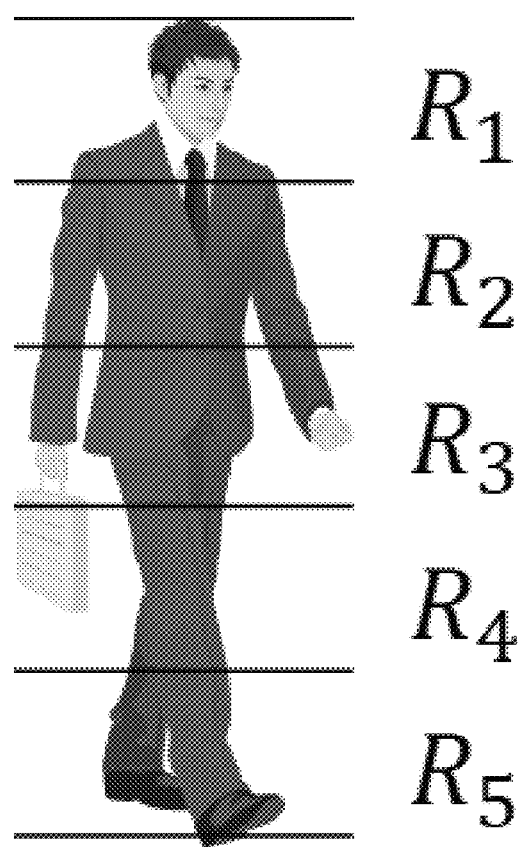
FIG. 5 is a diagram illustrating an example of region division of a person in calculation of an occlusion ratio.

The quality prediction unit 205 may calculate the degree of occlusion not by using the occlusion ratio of the entire object region but by considering which portion is occluded in the object region. For example, in a case where the object is a person, if a region close to the feet is hidden, the influence on the matching accuracy is small, but if a region close to the head region is hidden, the influence of the matching accuracy may be large. Thus, in a case where the degree of influence on the matching differs depending on an occluded part, the quality prediction unit 205 may calculate the occlusion ratio for each part and calculate the degree of occlusion by weighted addition of the occlusion ratios. For example, in a case where the object is a person, the quality prediction unit 205 divides the person into a plurality of regions R1, R2, . . . , RM (in FIG. 5, corresponding to the case of M=5) in the vertical direction by horizontal lines as illustrated in FIG. 5, calculates the occlusion ratio for each region, and calculates the degree of occlusion by weighted addition as represented in Equation 2. By calculating the degree of occlusion by performing weighted addition, the quality prediction unit 205 can calculate the quality index in which a part having a large influence on the matching accuracy is intensively considered.

$$r_{Occ} = \sum_{m=1}^{M} w_m r_m$$ [Equation 2]

Here, $r_m$ and $w_m$ are the occlusion ratio and the weighting factor, respectively, for the region $R_m$. The weighting coefficient is a coefficient that takes a larger value in a region having a larger influence on matching, and is normalized so that the sum becomes one. The quality prediction unit 205 can calculate a quality index based on the degree of occlusion using the degree of occlusion calculated by weighting on each part of the object.

The quality prediction unit 205 also calculates the quality index by other factors. As the size of the detection object is larger, even fine features of the object can be extracted, and thus, in general, the qualities of the features are higher as the size (resolution) of the object is larger. Thus, the quality prediction unit 205 obtains the value of the quality index $q_{Res}$ based on the resolution by Equation 3 using the size s of the object region (for example, the area of the region, the width and height of the region, and the like) obtained from an object detection result.

$$q_{Res} = f_{Res}(s)$$ [Equation 3]

Figure 4B:
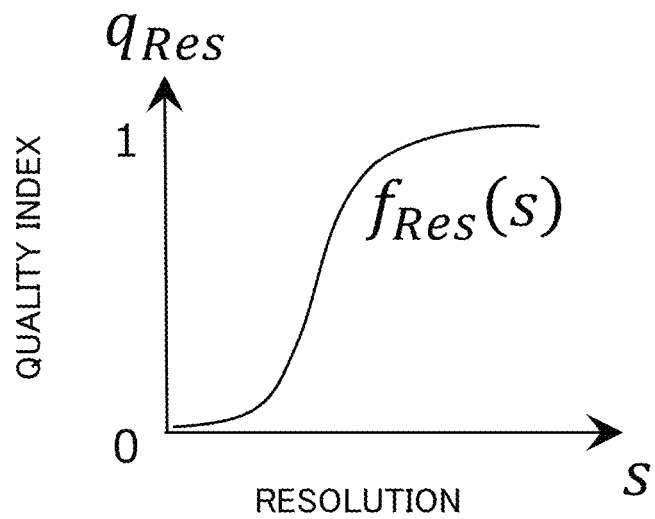
FIG. 4B is a diagram illustrating an example of a function used when calculating a quality index.

Here, $f_{Res}(S)$ is a monotonically non-decreasing function having [0, 1] as a value range, and is expressed as in FIG. 4B, for example. The quality prediction unit 205 uses, for example, this function obtained from the relationship between the size s and the matching accuracy as $f_{Res}(S)$.

In a case where motion of the object on the image is large, there is a high possibility that a fine pattern on an object surface (for example, a pattern of clothes in a case where the object is a person) cannot be correctly extracted due to the influence of a motion blur. Therefore, the qualities of the features decrease as the motion of the object on the image increases. Assuming that the amount of motion of the object on the image is v, the quality prediction unit 205 obtains a value of the quality index $q_{Mot}$ based on the motion by Equation 4.

$$q_{Mot} = f_{Mot}(v) \quad \text{[Equation 4]}$$

Figure 4C:
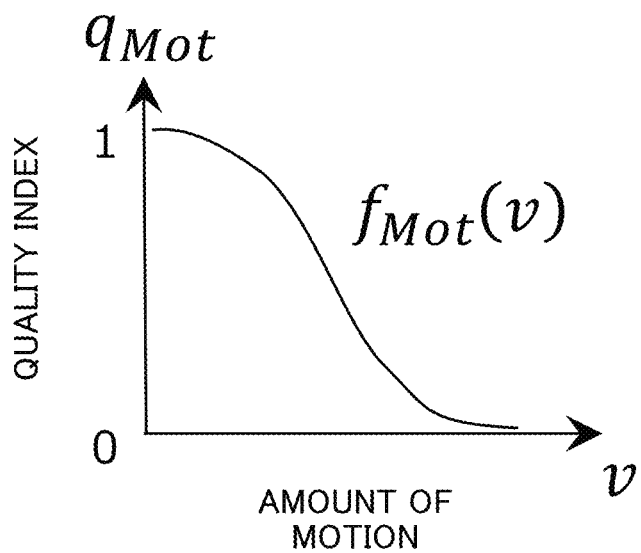
FIG. 4C is a diagram illustrating an example of a function used when calculating a quality index.

Here, $f_{Mot}(v)$ is a monotonically non-increasing function having [0, 1] as a value range, and is expressed as in FIG. 4C, for example. The quality prediction unit 205 uses, for example, this function obtained from the relationship between the amount of motion v on the image and the matching accuracy as $f_{Mot}(v)$. The quality prediction unit 205 can obtain the amount of motion v from the movement history of the tracking target object. For example, the quality prediction unit 205 stores the position of the object at the immediately before (or a certain number of times before), and obtains the amount of motion v on the image by calculating the difference from the position at the current time when the object tracking result is input.

In a case where a posture or orientation of the object is greatly deviated from a posture or orientation expected in the feature extraction, the extracted feature may be deviated from the assumption. Thus, it is considered that the qualities of the features decrease as the deviation from the expected posture and orientation increases with respect to the posture and orientation of the object. For example, in a case where the object is a person, when the posture expected in the extraction of the features is an upright posture, the deviation from the expected posture increases when the person squats or bends. The value representing the degree of this deviation is represented by a posture change degree $r_{Pos}$, which is an index in which the value increases as the deviation from the expected posture increases. The quality prediction unit 205 obtains a value of the quality index $q_{Pos}$ based on the posture and orientation by Equation 5.

$$q_{Pos} = f_{POS}(r_{POS}) \quad \text{[Equation 5]}$$

Figure 4D:
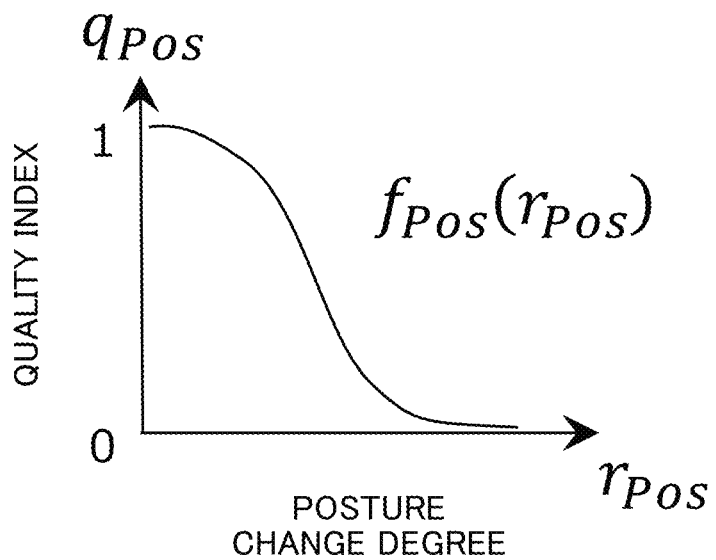
FIG. 4D is a diagram illustrating an example of a function used when calculating a quality index.

Here, $f_{Pos}(r_{Pos})$ is a monotonically non-increasing function having [0, 1] as a value range, and is expressed as in FIG. 4D, for example. The quality prediction unit 205 uses, for example, this function obtained from the relationship between the posture change degree $r_{Pos}$ and the matching accuracy as $f_{Pos}(r_{Pos})$.

The posture change degree $r_{Pos}$ is defined by, for example, how much an aspect ratio of an object detection rectangle deviates from an aspect ratio of an object circumscribed rectangle in a case of an expected posture. For example, the quality prediction unit 205 obtains an absolute value of a difference between the aspect ratio of the detection rectangle and the aspect ratio of the object circumscribed rectangle with respect to the expected posture, and sets the value as the posture change degree $r_{Pos}$. In a case where calibration information can be used for the video from the fixed camera, the quality prediction unit 205 can obtain the size of the object in the real space from the size of a rectangle of the image. For example, the quality prediction unit 205 obtains the size (for example, in a case of a person, the height of the person) of the object in the real space from the tracking result of the object, and detects a posture variation by checking time-series changes thereof. The quality prediction unit 205 may calculate the posture change degree according to the degree of change in size in the real space.

The quality prediction unit 205 may consider the orientation of the object. There are various methods for obtaining the orientation of the object in the quality prediction unit 205. For example, the quality prediction unit 205 specifies a moving direction of the object from the history of the position of the tracking result on the assumption that the moving direction and the orientation of the object match, and estimates the orientation. The quality prediction unit 205 may calculate the posture change degree by the magnitude of the deviation between the estimated orientation and the expected orientation (for example, the front or the like) of the feature extraction.

The environmental factor storage unit 206 stores a value of the quality index with respect to a decrease in qualities of the features caused by the environmental factor. For example, the environmental factor storage unit 206 stores, as an environmental factor that affects the qualities of the features, a quality index related to occlusion caused by an obstacle (a shelf, a desk, or the like) arranged in the environment, deterioration due to inappropriate lighting or sunshine conditions, deterioration due to a blur caused by out-of-focus of the camera, and the like. In a case where the imaging device is a fixed camera, the environmental factor storage unit 206 stores the imaging device on the assumption that these deterioration factors occur at specific locations on the image. The environmental factor storage unit 206 stores the value of the quality index in which the degree of quality degradation occurring when the object comes to each position on the image is estimated in association with the position. The environmental factor storage unit 206 stores the value of the quality index based on the environmental factor obtained for each coordinate (x, y) on the image, which is represented in Equation 6.

$$q_{Env} = f_{Env}(x, y) \quad \text{[Equation 6]}$$

Here, $f_{Env}(x, y)$ is a function having [0, 1] as a value range. Here, x and y are position coordinates of a reference point of the object, and for example, center coordinates of a grounding point of the object are used. The value of the function $f_{Env}(x, y)$ is determined on the basis of a result of obtaining how much the matching accuracy is deteriorated by an environmental factor occurring when the object comes to the position (x, y) on the image.

Although it is not an environmental factor, in a peripheral region of the image of the camera, a part of the object is outside the image, and a situation equivalent to that in which a part is occluded occurs. The quality prediction unit 205 and the environmental factor storage unit 206 may use a peripheral region of the image as an environmental factor, similarly to occlusion by an obstacle.

Among the above-described factors that affect the qualities of the features, the resolution may be treated as an environmental factor. Therefore, the quality prediction unit 205 and the environmental factor storage unit 206 may use the quality index based on the resolution as the quality index based on the environmental factor.

The above-described position information (x, y) may be real world coordinates or values obtained by converting the real world coordinates into coordinates of a map image, instead of on the image. In this case, the quality index $q_{Env}$ is obtained by Equation 6 after converting the position information of the object into the corresponding coordinate system.

The quality index based on the environmental factor may change dependent on the time of day due to differences in lighting and sunshine conditions between day and night. For example, the environmental factor storage unit 206 stores the value of the quality index for each time period. The quality prediction unit 205 may switch and use the quality index $q_{Env}$ according to the time of day of the video to be processed. The quality prediction unit 205 may use the value of the quality index by interpolation from the values of the quality index in the time periods before and after a transition under a situation where a transition of the environmental conditions occurs.

The quality prediction unit 205 calculates the overall quality index from the quality index for each factor. Specifically, the quality prediction unit 205 obtains the position (x, y) of the object at the current time from the position information of the tracking target object included in the object tracking result, and obtains the value of the quality index $q_{Env}$ based on the environmental factor at the position from the environmental factor storage unit 206. A function $g_1$ representing the relationship between the quality index and the overall quality index Q for each factor is defined as in Equation 7. The quality prediction unit 205 obtains the overall quality index Q by Equation 7.

$$Q = g_1(q_{Occ}, q_{Res}, q_{Mot}, q_{Pos}, q_{Env}) \quad \text{[Equation 7]}$$

As the function of Equation 7, for example, the function represented in Equation 8 is used.

$$g_1(q_{Occ}, q_{Res}, q_{Mot}, q_{Pos}, q_{Env}) = q_{Occ} q_{Res} q_{Mot} q_{Pos} q_{Env} \quad \text{[Equation 8]}$$

The quality prediction unit 205 can predict a decrease in qualities of the features that occurs on the basis of occlusion between objects or resolution, motion, posture, and environment, and can appropriately select an object from which the features are to be extracted.

Although various factors for calculating the overall quality index have been described so far, the quality prediction unit 205 does not need to use all the quality indexes, and may use only some of the quality indexes. For example, the quality prediction unit 205 calculates the quality index according to Equations 7 and 8 with the value of the quality index for a factor that is not used being one.

In the present example embodiment, the environmental factor storage unit 206 may not need to be provided. In this case, the quality prediction unit 205 calculates the overall quality index Q using Equation 9 including a function $g_2$ representing the relationship between the quality index and the overall quality index Q for each factor.

$$Q = g_2(q_{Occ}, q_{Res}, q_{Mot}, q_{Pos}) \quad \text{[Equation 9]}$$

As the function of Equation 9, for example, the function represented in Equation 10 is used.

$$g_2(q_{Occ}, q_{Res}, q_{Mot}, q_{Pos}) = q_{Occ} q_{Res} q_{Mot} q_{Pos} \quad \text{[Equation 10]}$$

The quality prediction unit 205 calculates a quality index for each tracking target object included in the object tracking result. The quality prediction unit 205 outputs the calculated quality index in association with information of the identifier of the tracking target object and the identifier of the detection object associated therewith.

The quality prediction unit 205 may not need to consider all the quality indexes in Equation 9, and may use only a part thereof. For example, the quality prediction unit 205 calculates the quality index according to Equations 9 and 10 with the value of the quality index for a factor that is not used being one.

As described above, the quality prediction unit 205 can predict that the qualities of the features decrease depending on occlusion between objects or resolution, motion, and posture. By using only a part of the quality indexes, the quality prediction unit 205 can calculate a quality index in which only indexes suitable for a scene to be adapted is considered from among occlusion between objects or resolution, motion, posture, and environmental factor. In this case, the quality prediction unit 205 can perform only processing suitable for each scene, and thus calculation resources can be efficiently used.

The selection unit 207 selects the object from which the features are to be extracted on the basis of the quality index output from the quality prediction unit 205, and outputs selected object information. The selection unit 207 selects the tracking target object having a large input value of the quality index. For example, the selection unit 207 selects one in which the value of the quality index is larger than a certain value. The selection unit 207 may select a certain number of tracking target objects (all if the number of objects is smaller than the certain number) from the largest one when sorting is performed by the value of the quality index. The selection unit 207 may select an object by combining both criteria (select a certain number from the largest among ones whose values of the quality indexes are equal to or more than a certain value).

The selection unit 207 combines the identifier of the selected tracking target object with the identifier of the detection object associated therewith, and outputs the combined identifiers as selected object information.

The feature extraction unit 208 extracts an object feature from the image on the basis of the selected object information and the detection result information. The feature extraction unit 208 obtains the position information of the detection object from the detection result information by the identifier of the detection object associated with the identifier of the tracking object included in the selected object information. The feature extraction unit 208 extracts the features of the corresponding image region as the object features of the identifier of the tracking object. The features to be extracted may be any feature that can be used to identify an object. For example, the features to be extracted are visual features representing the color, shape, pattern, and the like of the object. The features to be extracted may be a histogram of color or luminance gradient feature, a local feature such as scale-invariant feature transform (SIFT) or speeded-up robust features (SURF), features describing a pattern such as a Gabor wavelet, or the like. The features to be extracted may be features for object identification obtained by deep learning.

Figure 6:
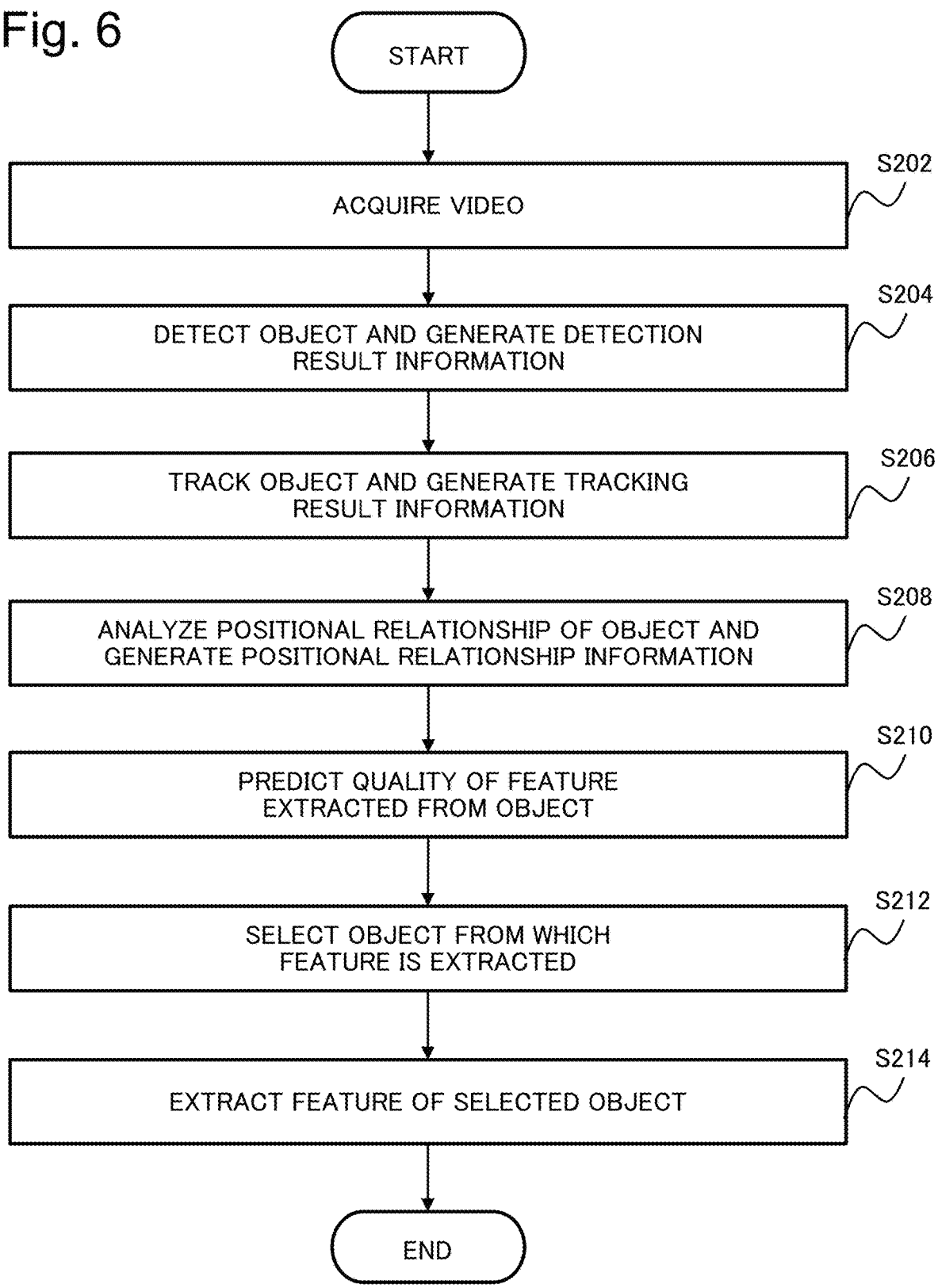
FIG. 6 is a flowchart illustrating processing operation of the information processing device according to the second example embodiment.

FIG. 6 is a flowchart illustrating a flow of processing executed by the information processing device 200 according to the second example embodiment.

In step S202, the video acquisition unit 201 acquires a video.

In step S204, the detection unit 202 detects an object from the video acquired in step S202 and generates the detection result information.

In step S206, the tracking unit 203 tracks the object from the video acquired in step S202 on the basis of the detection result information generated in step S204, and generates the tracking result information.

In step S208, the positional relationship analysis unit 204 analyzes the positional relationship of the object on the basis of the tracking result information generated in step S206, and generates the positional relationship information.

In step S210, the quality prediction unit 205 predicts the qualities of the features to be extracted from the object on the basis of the detection result information generated in step S204, the tracking result information generated in step S206, and the positional relationship information generated in step S208. When predicting the qualities of the features, the quality prediction unit 205 may refer to the quality index based on the environmental factor stored in the environmental factor storage unit 206.

In step S212, the selection unit 207 selects the object from which the features are to be extracted on the basis of the features predicted in step S210.

In step S214, the feature extraction unit 208 extracts the features of the object selected in step S212. After extracting the features, the information processing device 100 ends the processing.

As described above, the information processing device according to the present example embodiment can extract the features suitable for matching. In a case where the quality index based on the degree of occlusion is used, the information processing device according to the present example embodiment can extract the features suitable for matching in consideration of overlap between persons or occlusion caused by another obstacle. In a case where the quality index based on the resolution is used, the information processing device according to the present example embodiment can extract the features suitable for matching in consideration of the size of a person on the image. In a case where the quality index based on the motion is used, the information processing device according to the present example embodiment can extract the features suitable for matching in consideration of the possibility of occurrence of a motion blur. In a case where the quality index based on the posture and orientation is used, the information processing device according to the present example embodiment can extract the features suitable for matching in consideration of how much the posture and orientation of the object deviate from the expected posture and orientation. In a case where the quality index based on the environmental factor is used, the information processing device according to the present example embodiment can appropriately predict a decrease in the qualities of the features even in a case where a fixed quality deterioration occurs when the object comes to a particular position. The information processing device according to the present example embodiment switches the quality index based on the environmental factor according to the time of day, thereby being capable of appropriately coping with a case where the qualities of the features to be extracted changes with time. Therefore, in a case where the quality index based on the environmental factor is used, the information processing device according to the present example embodiment can extract features suitable for matching in consideration of a deterioration factor based on a blur, an illumination condition, or the like.

The information processing device according to the present example embodiment can select any quality index to be used, and thus can select an object to be subjected to feature extraction in consideration of only an index suitable for each scene from among occlusion between objects or resolution, motion, posture, and environmental factor. In this case, the information processing device according to the present example embodiment can perform only processing suitable for each scene, and thus can select an object from which features are to be extracted while efficiently using calculation resources.

The information processing device according to the present example embodiment can appropriately select an object to be subjected to feature extraction even in a situation where a large number of objects are shown in the image, and can achieve extraction of the features that enable highly accurate matching of objects as a whole while suppressing the cost required for the feature extraction processing. In particular, the information processing device according to the present example embodiment can appropriately select the object from which the feature is to be extracted even when an overlap occurs between objects due to a large number of objects.

Third Example Embodiment

Figure 7:
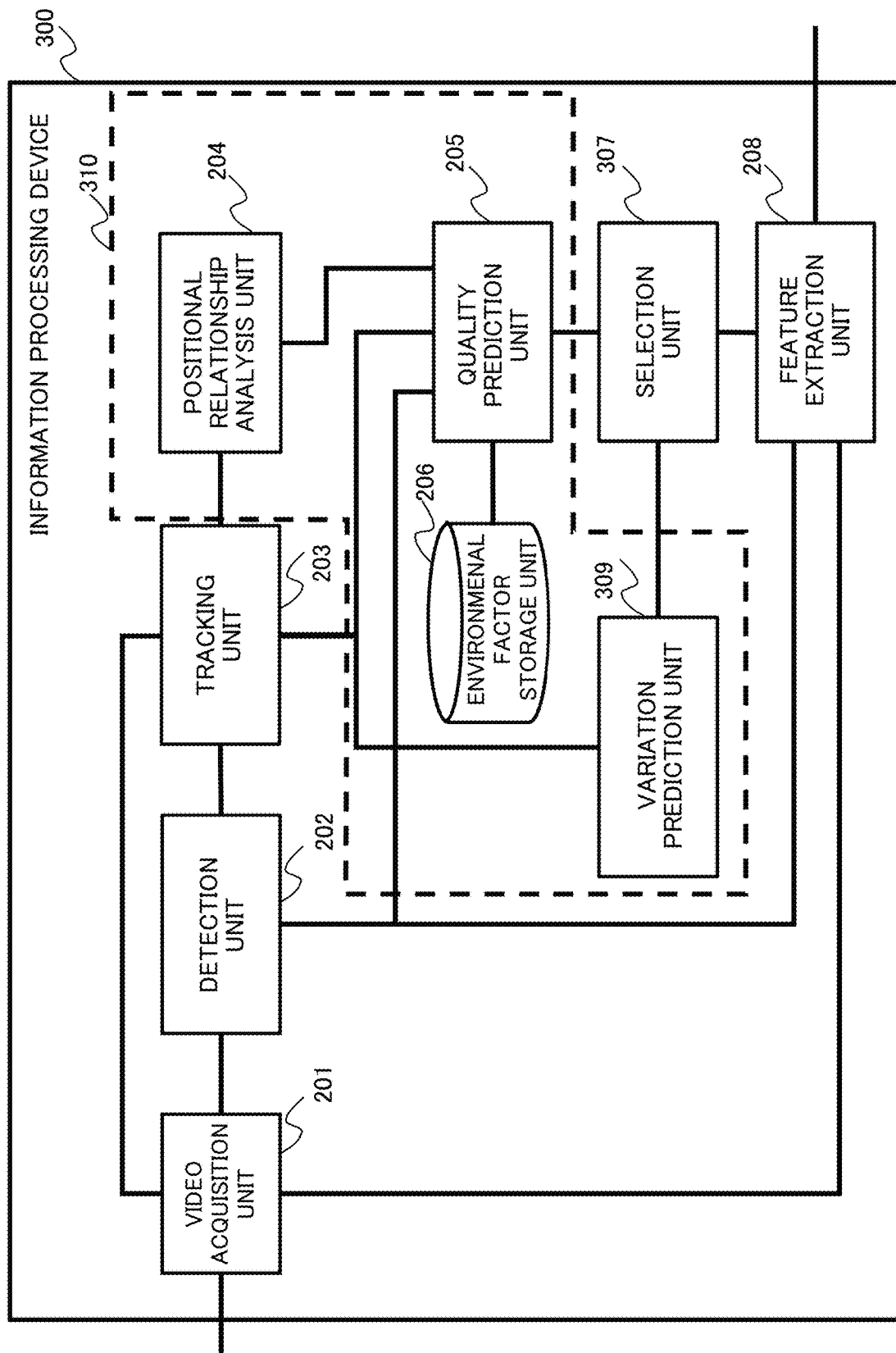
FIG. 7 is a diagram illustrating a configuration of an information processing device according to a third example embodiment.

FIG. 7 is a diagram illustrating a configuration of an information processing device 300 according to the present example embodiment.

Among the components of the information processing device 300, components that perform the same processing operations as those of the information processing device 200 of the second example embodiment are denoted by the same reference numerals as those in FIG. 3, and detailed description thereof will be omitted.

The information processing device 300 illustrated in FIG. 7 includes a video acquisition unit 201, a detection unit 202, a tracking unit 203, a prediction unit 310, a selection unit 307, and a feature extraction unit 208.

The prediction unit 310 includes a positional relationship analysis unit 204, a quality prediction unit 205, an environmental factor storage unit 206, and a variation prediction unit 309.

The video acquisition unit 201, the detection unit 202, the tracking unit 203, the positional relationship analysis unit 204, the quality prediction unit 205, the environmental factor storage unit 206, and the feature extraction unit 208 are similar to those in the second example embodiment.

The variation prediction unit 309 predicts an improvement possibility that the variation of the features is improved by extracting the features from the object. Details of the variation prediction unit 309 will be described later.

Figure 8:
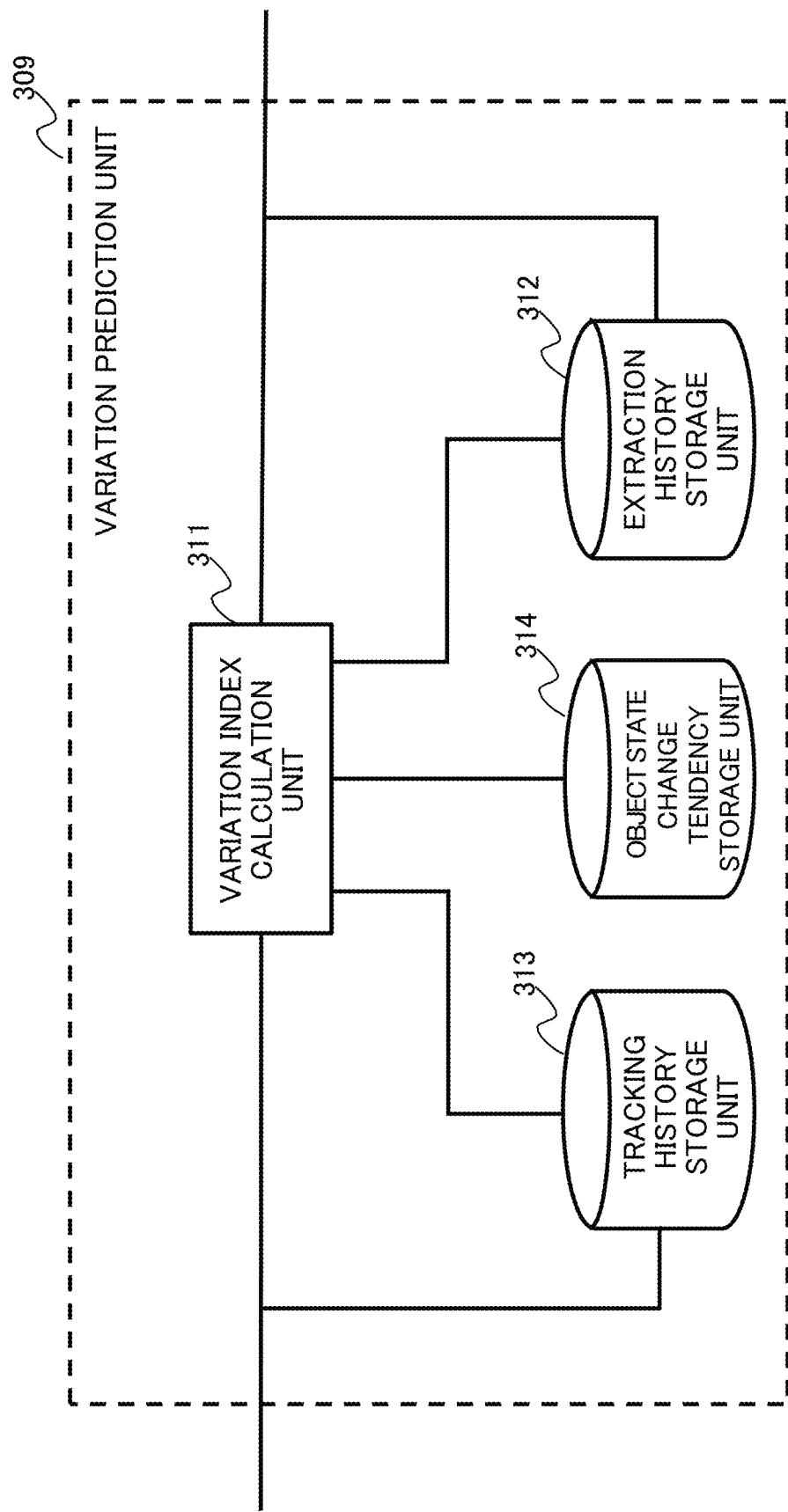
FIG. 8 is a diagram illustrating a configuration of a variation prediction unit according to the third example embodiment.

FIG. 8 is a diagram illustrating a configuration of the variation prediction unit 309 according to the present example embodiment.

The variation prediction unit 309 illustrated in FIG. 8 includes a variation index calculation unit 311, an extraction history storage unit 312, a tracking history storage unit 313, and an object state change tendency storage unit 314.

The selected object information and tracking result information that are information of an object selected by the selection unit 307 at a previous time are input to the variation prediction unit 309. The variation prediction unit 309 calculates a variation index for each tracking target object included in the tracking result information.

The variation index is an index indicating a possibility of improving variation (diversity) of the acquired feature. The features of the extracted object can change depending on the state of the object, and thus it is desirable to use features in various states of the same object in order to reduce miss-matching in object matching. No matter how many times the feature extraction is performed in a situation where the state of the object has hardly changed, almost the same feature will only be acquired repeatedly, and the miss-matching in the object matching will not be reduced. Therefore, in the acquisition of the features of the object in time series, it is important to increase variation of the acquired feature while avoiding redundant acquisition of the features as much as possible. The variation index is an index obtained by predicting, before extraction of the features, whether the variation of the features can be increased by acquiring the features at the current time in addition to the feature group acquired so far, that is, whether the variation of the acquired feature can be improved (improvement possibility). It is desirable that the selection unit 307 preferentially select an object with a larger variation index. The selection unit 307 uses the variation index as a criterion for object selection.

The variation prediction unit 309 outputs the calculated variation index to the selection unit 307 in association with the identifier of the tracking target object.

The variation index calculation unit 311 calculates and outputs a variation index on the basis of the input tracking result information, the feature extraction history information output from the extraction history storage unit 312, the tracking history information output from the tracking history storage unit 313, and the object state change tendency information output from the object state change tendency storage unit 314.

The variation index calculation unit 311 may calculate and output the variation index only on the basis of the input tracking result information and the feature extraction history information output from the extraction history storage unit 312. The variation index calculation unit 311 may calculate and output the variation index only on the basis of the input tracking result information, the feature extraction history information output from the extraction history storage unit 312, and the tracking history information output from the tracking history storage unit 313.

The extraction history storage unit 312 updates and stores the feature extraction history of each object on the basis of the selected object information input from the selection unit 307. The extraction history storage unit 312 outputs the feature extraction history information to the variation index calculation unit 311.

The extraction history storage unit 312 stores, for the identifier of each tracking target object, information of the time when the object is selected as the object from which the features are to be extracted. When the object selected by the selection unit 307 is input, the extraction history storage unit 312 adds information of the time when the object is selected to the identifier of the tracking target object included in the information of the object selected by the selection unit 307. The extraction history storage unit 312 may record information of the number of times of the feature extraction in the past for the identifier of each tracking target object. In this case, the extraction history storage unit 312 increases the number of times of the feature extraction of the tracking target object included in the selected object information by one.

The variation index calculation unit 311 calculates the variation index for each tracking target object included in the input object tracking result. As described above, in order to improve the miss-matching at the time of object matching, it is important to increase the variation of the features. The increase in the variation of the features depends on the acquisition history of the features so far. The state of the object changes as a certain time elapses after the features are acquired last time, and thus the possibility that the features leading to improvement of variation are extracted increases. Assuming that the variation index is V, when the variation index is calculated only on the basis of the input tracking result information and the feature extraction history information output from the extraction history storage unit 313, the variation index calculation unit 311 calculates the variation index V using Equation 11.

$$V = h_1(t) \quad \text{[Equation 11]}$$

Figure 9A:
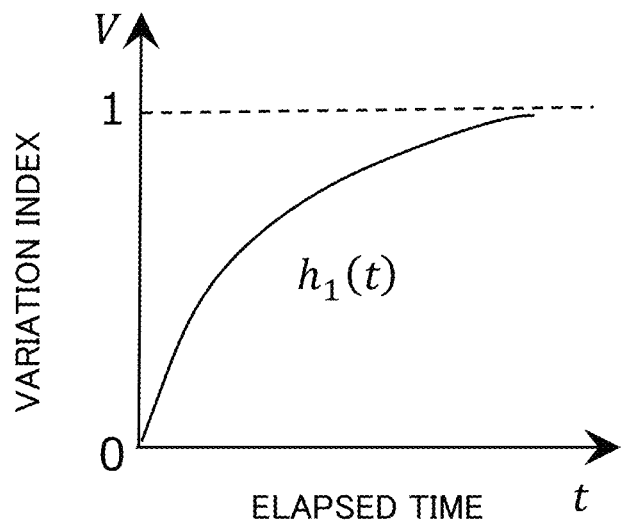
FIG. 9A is a diagram illustrating an example of a function used when a variation index is calculated.

Here, the function $h_1(t)$ is a monotonically non-decreasing function with respect to the elapsed time t from the previous feature extraction, and the value range is [0, 1]. Therefore, the variation index calculation unit 311 uses a function as illustrated in FIG. 9A, for example. In a case where the features have never been extracted, the variation index calculation unit 311 sets the previous feature extraction time to $t = -\infty$ and sets the value of the variation index to $h_1(\infty)$.

In the above-described example, the variation index calculation unit 311 simply calculates the variation index using only the elapsed time from the previous feature extraction, but the number of times of feature extraction so far may be used. As the number of times of extraction of the features increases, the variation of the acquired feature increases. Therefore, the frequency of the feature extraction may be lowered as the number of times of the feature extraction increases. The variation index calculation unit 311 uses a function in which the value of the variation index decreases as the number of times of the feature extraction increases. The variation index calculation unit 311 calculates the variation index V as a function of the elapsed time t and the number n of times of feature extraction by using Equation 12.

$$V = h_2(t, n) \quad \text{[Equation 12]}$$

Figure 9B:
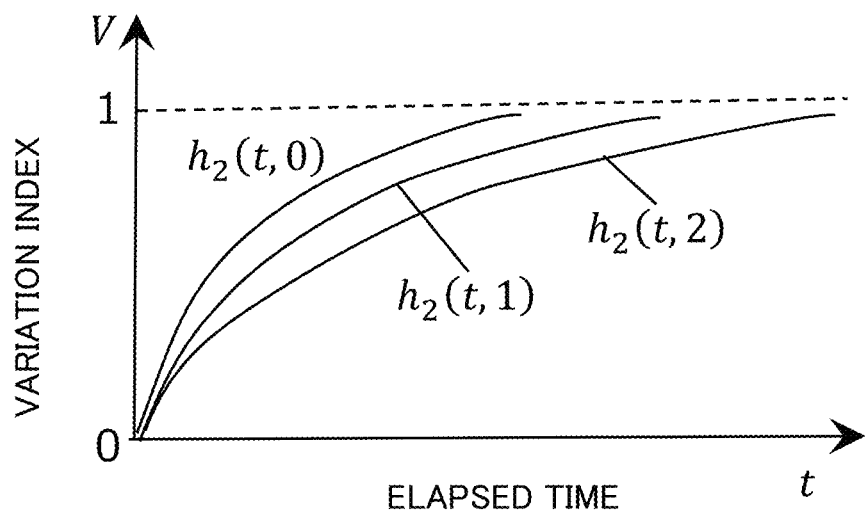
FIG. 9B is a diagram illustrating an example of a function used at the time of calculating a variation index.

Here, the function $h_2(t, n)$ is a function that becomes a monotonically non-decreasing function of t when n is fixed and becomes a monotonically non-increasing function of n when t is fixed, and the value range is [0, 1]. The variation index calculation unit 311 uses, for example, a function as illustrated in FIG. 9B.

The variation index calculation unit 311 calculates the variation index V for each tracking target object included in the object tracking result. The variation index calculation unit 311 outputs the calculated variation index in association with the identifier of the tracking target object.

The variation index calculation unit 311 can predict the improvement possibility of the variation of the acquired feature from the feature extraction history and calculate the index for appropriately selecting the object from which the features are to be extracted.

The tracking history storage unit 313 stores information regarding the tracking result so far for the identifier of each tracking target object. Specifically, the tracking history storage unit 313 stores position information (also including information regarding the size of the object, such as information of the circumscribed rectangle of the object) of the object at each time and information regarding whether it is associated with the detection object. When the tracking result information is input, the tracking history storage unit 313 adds the information of each tracking target object included in the tracking result information to the data of the identifier of the corresponding tracking target object.

For an object continuing to stay at the same place, it is highly possible that the state does not change much even when time has elapsed from the previous feature extraction, and it is highly possible that only the features having substantially the same variation as the previous variation can be obtained even if the feature extraction is performed. On the other hand, for a moving object, it is highly possible that the state is greatly changed even if the elapsed time from the previous feature extraction is short. Therefore, the variation index calculation unit 311 obtains how much the object is moving using the tracking history information, and changes the value of the variation index according to the obtained movement amount. For example, the variation index calculation unit 311 reads the position of the object at a certain time before the current time from the tracking history storage unit 313, obtains a difference from the position at the current time included in the tracking result information, and calculates a movement amount d. The variation index calculation unit 311 may obtain the movement amount as a movement amount on the image. The variation index calculation unit 311 may convert the movement amount d into the real world coordinate system and obtain the movement amount as a movement amount in the real world.

When calculating the variation index V only on the basis of the input tracking result information, the feature extraction history information output from the extraction history storage unit 312, and the tracking history information output from the tracking history storage unit 313, the variation index calculation unit 311 calculates the variation index V using Equation 13. In Equation 13, the elapsed time is t, the number of times of the feature extraction is n, and the movement amount is d.

$$V = h_3(t, n, d) \quad \text{[Equation 13]}$$

Figure 9C:
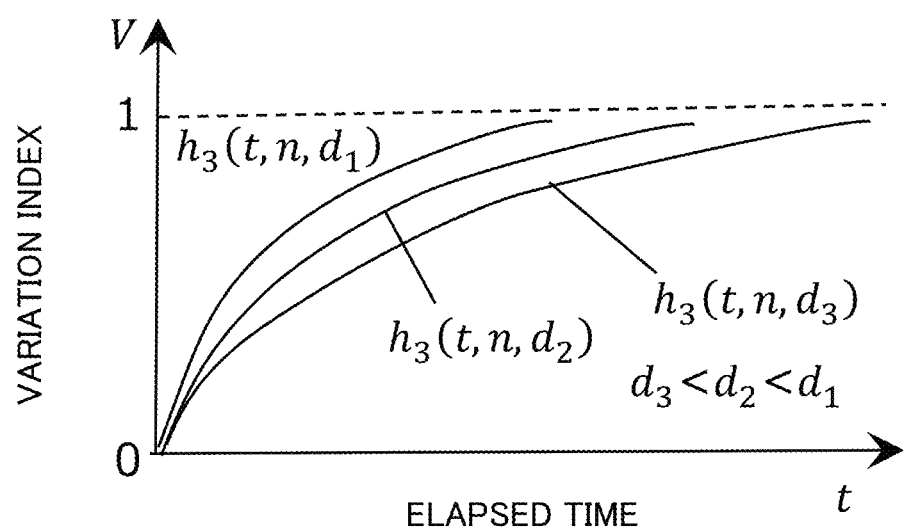
FIG. 9C is a diagram illustrating an example of a function used at a time of calculating a variation index.

Here, the function $h_3(t, n, d)$ has [0, 1] as a value range, and is a monotonically non-decreasing function of t when n and d are fixed, is a monotonically non-increasing function of n when t and d are fixed, and is a monotonically non-decreasing function of d when t and n are fixed. The variation index calculation unit 311 uses, for example, a function as illustrated in FIG. 9C.

The variation index calculation unit 311 uses the tracking result information, and thus acquires information regarding the state of the object such as the orientation of the object. In a case where the features can change according to the state of the object, by extracting and retaining the features for each state and using the features for matching, missmatching at the time of object matching are reduced. Therefore, the variation index calculation unit 311 retains a history of feature extraction for each state of the object, and calculates the variation index according to the state of the object at that time. The tracking history storage unit 313 also retains information regarding the state of the object as a tracking result.

The tracking history storage unit 313 sets a category representing the state of the object to c=1, . . . , C. This category is, for example, a category related to the orientation of the object such as front, right, back, and left. The variation index calculation unit 311 calculates the variation index V for each category by using Equation 14.

$$V = h_{3,c}(t_c, n_c, d_c) \quad \text{[Equation 14]}$$

Here, the function $h_{3,c}$ is a function for obtaining the function $h_3$ of Equation 13 for each category. First, the variation index calculation unit 311 estimates which category the current state of the object corresponds to on the basis of the tracking result information, and calculates the variation index using the function of the estimated category. For example, when the category is the orientation, the variation index calculation unit 311 obtains the moving direction of the object from the tracking history of the object, and estimates the orientation on the basis of the movement direction. When the orientation cannot be obtained, the variation index calculation unit 311 calculates the variation index by providing a category of orientation unknown.

This category does not necessarily depend on the orientation, and may be various categories reflecting the state of the object. In a case where the category classification is difficult only with the tracking information, the tracking history storage unit 313 may perform the category classification of the state of the object including other information. The variation index calculation unit 311 outputs the calculated variation index in association with the identifier of the tracking target object.

The variation index calculation unit 311 can more accurately reflect presence or absence of a change in the features of the object and the possibility of variation improvement on the variation index, by using up to presence or absence of movement and the category according to the state of the object.

The object state change tendency storage unit 314 stores information indicating a tendency of the state change of the object that can change according to the location in the image. The tendency of the object to take a certain state may vary depending on a place where the object exists. For example, in a case where the object is a person, a camera installed at a corner of a passage and capable of capturing a state where the person turns while walking can extract features of the person in various orientations when the person turns at the corner. On the other hand, at other positions, the relationship between the orientation of the person and the orientation of the camera is less likely to change, and thus, there is a high possibility that a feature only in a specific orientation is extracted. In a case where the degree of state change of the object varies depending on the place, the variation index is efficiently improved by performing the feature extraction more frequently at a place where the state change is likely to occur, than at other places. The object state change tendency storage unit 314 stores in advance a multiplier $\alpha$ reflecting the likelihood of the state change defined for each place (x, y), as represented by Equation 15.

$$\alpha = h_{Loc}(x, y) \quad \text{[Equation 15]}$$

Here, the function $h_{Loc}$ is a function having a value range of [0, 1], and is a function whose value is larger where the state change of the object occurs more easily on the image. The variation index calculation unit 311 can calculate, as the overall variation index V, a value obtained by multiplying, by the multiplier $\alpha$ of Equation 15, the variation index V that is obtained using the equations from Equation 11 to Equation 14. More specifically, the variation index calculation unit 311 obtains the position (x, y) of the tracking target object from the tracking result information, reads the value of the multiplier $\alpha$ as the object state change tendency information on the basis of this position value, and multiplies the value of the variation index V by the value of the multiplier $\alpha$. The variation index calculation unit 311 outputs the calculated overall variation index in association with the identifier of the tracking target object.

The variation index calculation unit 311 can more accurately reflect presence or absence of the change in the features of the object on the variation index by considering a tendency of the change in the object state according to the place.

Note that although various methods for calculating the variation index have been described so far, the method of calculating the variation index is not limited to the above method. For example, the variation index calculation unit 311 may calculate and output the variation index only on the basis of the tracking result information and the tracking history information output from the tracking history storage unit 313. The variation index calculation unit 311 may calculate and output the variation index only on the basis of the tracking result information and the object state change tendency information output from the object state change tendency storage unit 314.

The selection unit 307 selects the object from which the features are to be extracted on the basis of the quality index output from the quality prediction unit 205 and the variation index output from the variation prediction unit 309, and outputs selected object information. The selection unit 307 also outputs the selected object information to the variation prediction unit 309 for variation determination at a later time. The selected object information includes a selection index I calculated on the basis of the quality index calculated by the quality prediction unit 205 and the variation index calculated by the variation prediction unit 309. When a function for calculating the selection index I is F, the selection unit 307 calculates the selection index I by using Equation 16.

$$I=F(Q,V) \qquad \text{[Equation 16]}$$

As the function of Equation 16, for example, a function of Equation 17 is used.

$$F(Q,V)=QV \qquad \text{[Equation 17]}$$

The selection unit 307 selects a tracking target object having a large value of the selection index I. For example, the selection unit 307 selects one in which the value of the selection index is larger than a certain value. The selection unit 307 may select a certain number of tracking target objects (all if the number of objects is smaller than the certain number) from the largest one when sorting is performed by the value of the selection index. The selection unit 307 may select an object by combining both criteria (for example, a certain number from the largest among ones in which values of the selection indexes are equal to or more than a certain value).

The selection unit 307 combines the identifier of the selected tracking target object with the identifier of the detection object associated with the selected tracking target object, and outputs the combined identifier as selected object information. The selected object information is output to the variation prediction unit 309 and used for calculating the variation index at a later time.

FIG. 10 is a flowchart illustrating a flow of processing executed by the information processing device 300 according to the third example embodiment.

Steps S202, S204, S206, S208, and S210 are similar to those in the second example embodiment.

In step S302, the variation prediction unit 309 predicts the improvement possibility that the variation of the features is improved on the basis of the tracking result information generated in step S206 and the selected object information fed back from the selection unit 307.

In step S304, the selection unit 307 selects the object from which the features are to be extracted on the basis of the qualities of the features predicted in step S210 and the improvement possibility predicted in step S302.

Step S214 is similar to that in the second example embodiment.

As described above, the information processing device according to the present example embodiment can extract the features suitable for matching. The information processing device according to the present example embodiment can suppress the possibility of large variability in the number of feature extraction times among different persons by considering the extraction history of the features. By considering the tracking history of the object, the information processing device according to the present example embodiment can extract the feature suitable for matching by adapting to a case where the object that has passed through time from the previous feature extraction continues to stay at the same place, a case where the state has greatly changed because the object is moving even if the elapsed time from the previous feature extraction is short, or the like. By considering the state change tendency of the object, the information processing device according to the present example embodiment can reflect presence or absence of a change in the features due to a change in the object state according to the place on the variation index, and more appropriate object selection can be performed.

Fourth Example Embodiment

Figure 11:
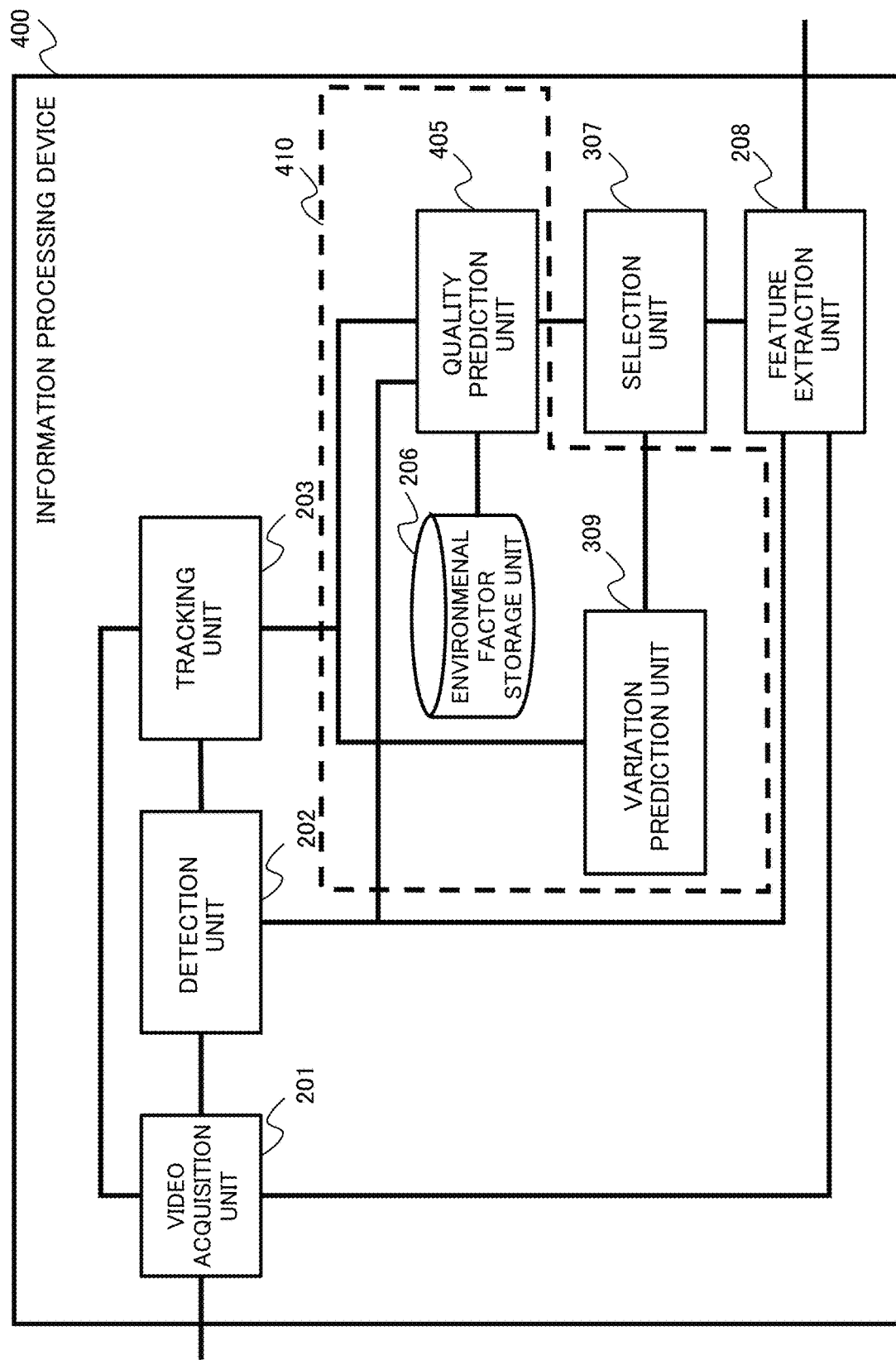
FIG. 11 is a diagram illustrating a configuration of an information processing device according to a fourth example embodiment.

FIG. 11 is a diagram illustrating a configuration of an information processing device 400 according to the present example embodiment.

Among the components of the information processing device 400, components that perform the same processing operations as those of the information processing device 300 of the third example embodiment are denoted by the same reference numerals as those in FIG. 7, and detailed description thereof will be omitted.

The information processing device 400 illustrated in FIG. 11 includes a video acquisition unit 201, a detection unit 202, a tracking unit 203, a prediction unit 410, a selection unit 307, and a feature extraction unit 208.

The prediction unit 410 includes a quality prediction unit 405, an environmental factor storage unit 206, and a variation prediction unit 309.

The video acquisition unit 201, the detection unit 202, the tracking unit 203, the environmental factor storage unit 206, and the feature extraction unit 208 are similar to those in the second example embodiment.

The variation prediction unit 309 and the selection unit 307 are similar to those in the third example embodiment.

The detection result information and the tracking result information at the current time are input to the quality prediction unit 405. A difference from the quality prediction unit 205 of the second example embodiment is that the object positional relationship information is not input. Therefore, the description overlapping with that of the quality prediction unit 205 of the second example embodiment will be omitted.

The quality prediction unit 405 obtains the quality index on the basis of the input tracking result information and detection result information, and the environmental factor information stored in the environmental factor storage unit 206, and outputs the quality index to the selection unit 307.

The quality prediction unit 405 calculates the overall quality index from the quality index for each factor. Specifically, the quality prediction unit 405 obtains the position (x, y) of the object at the current time from the position information of the tracking target object included in the object tracking result, and obtains the value of the quality index $q_{Env}$ based on the environmental factor at the position from the environmental factor storage unit 206. The function $g_3$ represents the relationship between the quality index and the overall quality index Q for each factor, and is defined as in Equation 18. The quality prediction unit 405 obtains the overall quality index Q by Equation 18.

$$Q=g_3(q_{Res},q_{Mot},q_{Pos},q_{Env}) \qquad \text{[Equation 18]}$$

As the function of Equation 18, for example, a function represented in Equation 8 is used.

$$g_3(q_{Res},q_{Mot},q_{Pos},q_{Env})=q_{Res}q_{Mot}q_{Pos}q_{Env} \qquad \text{[Equation 19]}$$

The quality prediction unit 405 can predict a decrease in qualities of the features that occurs on the basis of resolution, motion, posture, and environment, and can appropriately select the object from which the features are to be extracted.

The quality prediction unit 405 does not need to use all the quality indexes, and may use at least one of quality decreases of the features that occur on the basis of the resolution, the motion, the posture, and the environment. For example, the quality prediction unit 405 calculates the quality index according to Equations 18 and 19, assuming that the value of the quality index for a factor that is not considered is one.

In the present example embodiment, the environmental factor storage unit 206 does not need to be provided. In this case, the quality prediction unit 405 calculates the overall quality index Q by using Equation 20 including a function $g_4$ representing the relationship between the quality index and the overall quality index Q for each factor.

$$Q = g_4(q_{Res}, q_{Mo}, q_{Pos}) \quad \text{[Equation 20]}$$

As the function of Equation 20, for example, the function represented in Equation 21 is used.

$$g_4(q_{Res}, q_{Mo}, q_{Pos}) = q_{Res} q_{Mo} q_{Pos} \quad \text{[Equation 21]}$$

The quality prediction unit 405 does not need to use all the quality indexes in Equation 20, and may use only a part thereof. For example, the quality prediction unit 405 calculates the quality index according to Equations 20 and 21, assuming that the value of the quality index for a factor that is not used is one.

Figure 12:
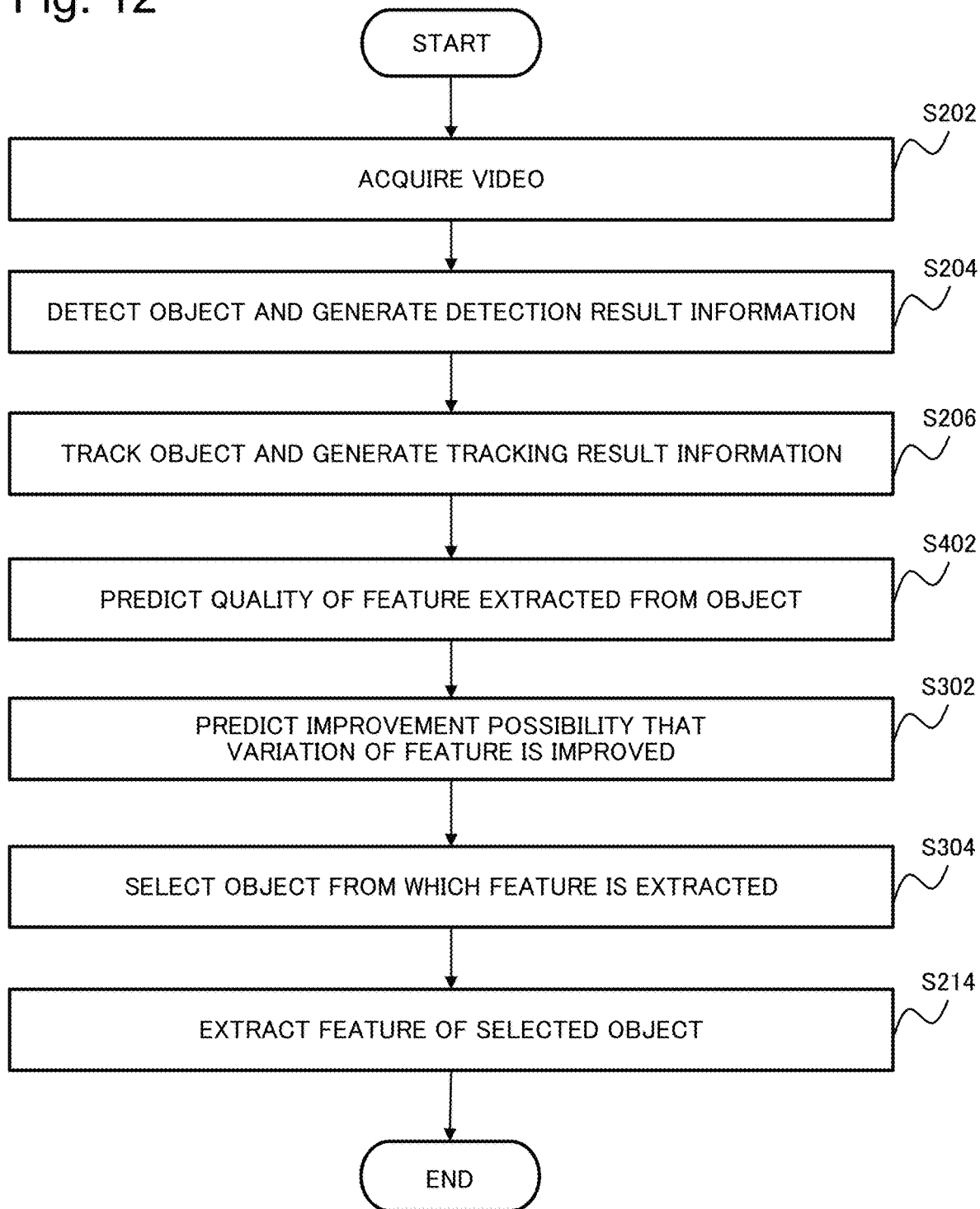
FIG. 12 is a flowchart illustrating processing operation of the information processing device according to the fourth example embodiment.

FIG. 12 is a flowchart illustrating a flow of processing executed by the information processing device 400 according to the fourth example embodiment.

Steps S202, S204, and S206 are similar to those in the second example embodiment.

In step S402, the quality prediction unit 405 predicts the qualities of the features to be extracted from the object on the basis of the detection result information generated in step S204 and the tracking result information generated in step S206. When predicting the qualities of the features, the quality prediction unit 405 may refer to the quality index based on the environmental factor stored in the environmental factor storage unit 206.

Steps S302 and S304 are similar to those in the third example embodiment.

Step S214 is similar to that in the second example embodiment.

As described above, the information processing device according to the present example embodiment can extract the features suitable for matching. The information processing device according to the present example embodiment can appropriately determine the necessity of extraction of the features by simultaneously predicting not only the qualities of the features but also the improvement possibility of the variation even in a case where the object exists alone. Therefore, the information processing device according to the present example embodiment can reduce the calculation cost for extracting the features.

Fifth Example Embodiment

Figure 13:
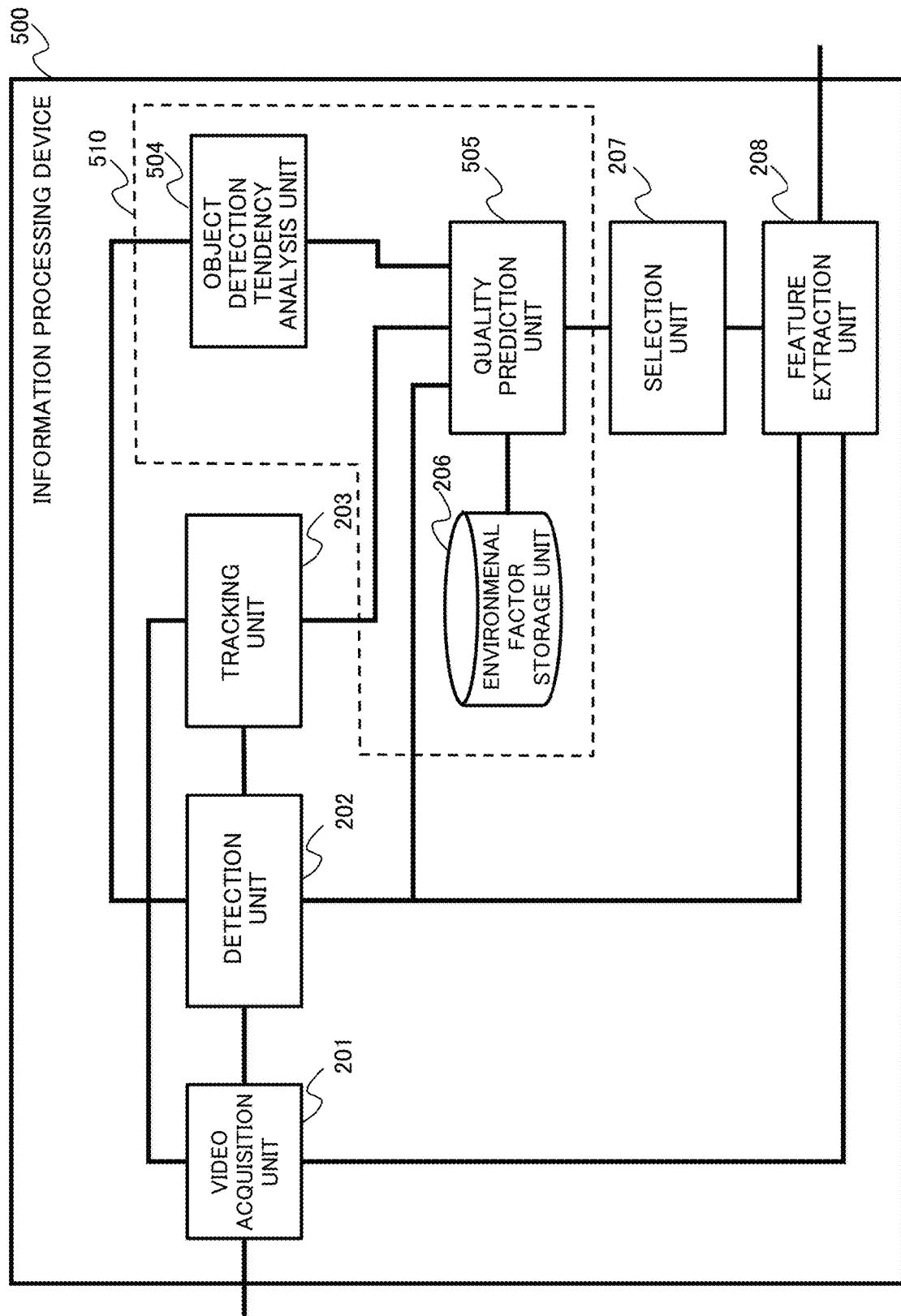
FIG. 13 is a diagram illustrating a configuration of an information processing device according to a fifth example embodiment.

FIG. 13 is a diagram illustrating a configuration of an information processing device 500 according to the present example embodiment.

Among the components of the information processing device 500, components that perform the same processing operations as those of the information processing device 200 of the second example embodiment are denoted by the same reference numerals as those in FIG. 3, and detailed description thereof will be omitted.

The information processing device 500 illustrated in FIG. 13 includes a video acquisition unit 201, a detection unit 202, a tracking unit 203, a prediction unit 510, a selection unit 207, and a feature extraction unit 208.

The prediction unit 510 includes an object detection tendency analysis unit 504, a quality prediction unit 505, and an environmental factor storage unit 206.

The video acquisition unit 201, the detection unit 202, the tracking unit 203, the environmental factor storage unit 206, the selection unit 207, and the feature extraction unit 208 are similar to those in the second example embodiment.

The object detection tendency analysis unit 504 analyzes the input detection result information and obtains detection tendency information for each place of the image. The object is occluded in a place where there is an obstacle such as a shelf, and there are more cases where the object is not detected. The object is not detected at all when the whole is hidden, but may or may not be detected when a part is hidden. When the number of times of detection of the object within a certain fixed time is counted for each place, the frequency is high in a place where there is no obstacle or the like, whereas the frequency of detection of the object is low in a place hidden by an obstacle or the like. The object detection tendency analysis unit 504 generates frequency information for each place as the detection tendency information.

In a case where the detection unit 202 is a means that detects a plurality of parts of an object, the object detection tendency analysis unit 504 may aggregate the number of times of detection of the parts of the object within a certain fixed time for each place. The object detection tendency analysis unit 504 may aggregate tendencies of simultaneous detection such as whether a plurality of parts is simultaneously detected for each place, and include the tendencies in the detection tendency information.

For example, in a case where the object is a person and the detection unit 202 is a detection means that simultaneously detects the head and the human body of the person, the object detection tendency analysis unit 504 aggregates the detection frequency for each of the head and the human body for each place. The object detection tendency analysis unit 504 may aggregate the number of times both the head and the human body are simultaneously detected for each place. The object detection tendency analysis unit 504 uses the number of times of simultaneous detection for determining a tendency of partial occlusion at the place. In a case where the head and the human body are simultaneously detected, the tendency that the human body is often not detected even though the head is detected is highly possible that the human body is not detected even though the person is present. This tendency indicates that there is a high possibility that a region below the head of the human body region is hidden at the place.

The object detection tendency analysis unit 504 outputs the generated detection tendency information to the quality prediction unit 505.

The object detection tendency analysis unit 504 can generate the detection tendency information reflecting the tendency of object occlusion for each place in detail by determining the detection results of the plurality of parts together.

The detection result information, the tracking result information, and the detection tendency information at the current time are input to the quality prediction unit 505. A difference from the quality prediction unit 405 of the fourth example embodiment is that detection tendency information is input. Therefore, the description overlapping with the quality prediction unit 205 of the second example embodiment and the quality prediction unit 405 of the fourth example embodiment will be omitted.

The quality prediction unit 505 obtains the quality index on the basis of the input tracking result information, detection result information, and detection tendency information, and the environmental factor information stored in the environmental factor storage unit 206, and outputs the quality index to the selection unit 207.

The quality prediction unit 505 uses the detection tendency information to determine a situation of occlusion of an object by an obstacle. Assuming that the detection frequency of the object at the place (x, y) is Freq(x, y), the quality prediction unit 505 calculates a multiplier β using Equation 22. The quality prediction unit 505 multiplies the quality index obtained from the detection result information and the tracking result information by the multiplier β to calculate a final quality index.

$$\beta = q_{Loc}(\text{Freq}(x,y)) \quad \text{[Equation 22]}$$

Here, the function $q_{Loc}$ is a monotonically non-decreasing function with respect to the frequency Freq(x, y). In a case where the frequency of simultaneous detection of a plurality of parts is included, the quality prediction unit 505 may use a ratio obtained by dividing the frequency of simultaneous detection by the frequency of the most detected part instead of the detection frequency.

The quality prediction unit 505 outputs the calculated quality index to the selection unit 207.

Figure 14:
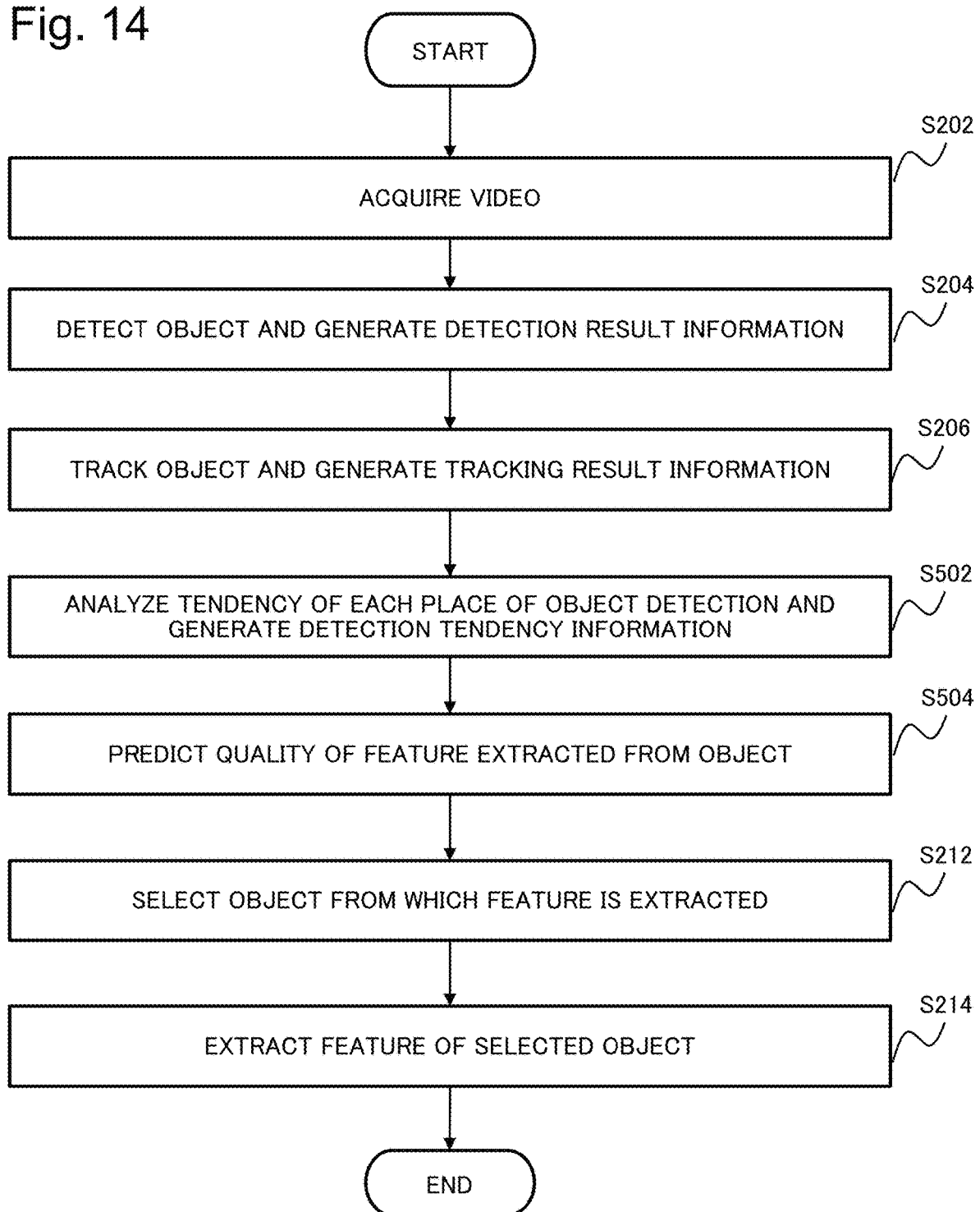
FIG. 14 is a flowchart illustrating processing operation of the information processing device according to the fifth example embodiment.

FIG. 14 is a flowchart illustrating a flow of processing executed by the information processing device 500 according to the fifth example embodiment.

Steps S202, S204, and S206 are similar to those in the second example embodiment.

In step S502, the object detection tendency analysis unit 504 analyzes a tendency of each place of object detection and generates the detection tendency information.

In step S504, the quality prediction unit 505 predicts the qualities of the features to be extracted from the object on the basis of the detection result information generated in step S204, the tracking result information generated in step S206, and the detection tendency information generated in step S502. When predicting the qualities of the features, the quality prediction unit 505 may refer to the quality index based on the environmental factor stored in the environmental factor storage unit 206.

Steps S212 and S214 are similar to those in the second example embodiment.

As described above, the information processing device according to the present example embodiment can extract the features suitable for matching. The information processing device according to the present example embodiment can appropriately determine the necessity of extraction of the features by automatically determining a occlusion occurrence tendency of the object by place even in a case where the object exists alone. Therefore, the information processing device according to the present example embodiment can reduce the calculation cost for extracting the features.

Sixth Example Embodiment

Figure 15:
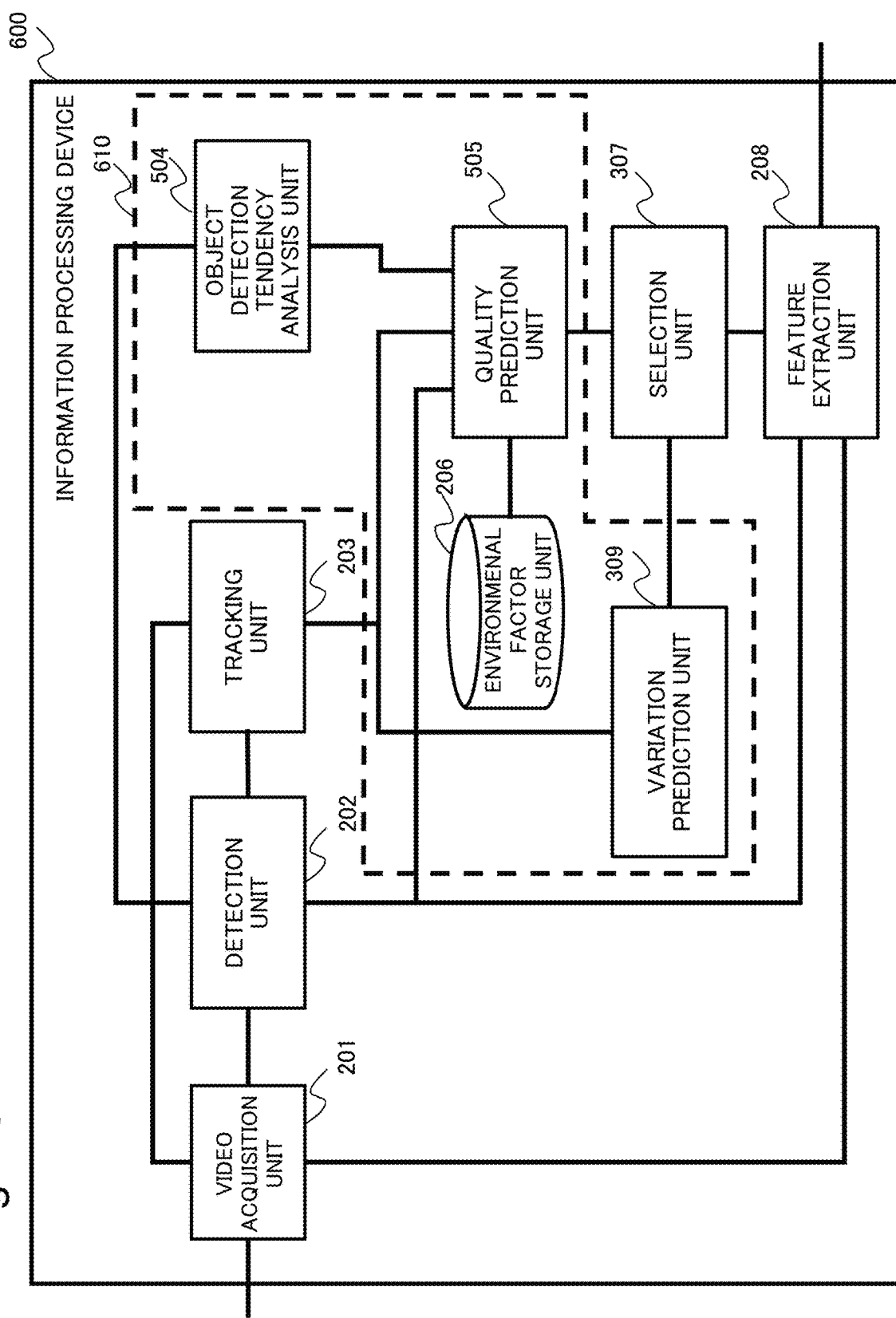
FIG. 15 is a diagram illustrating a configuration of an information processing device according to a sixth example embodiment.

FIG. 15 is a diagram illustrating a configuration of an information processing device 600 according to the present example embodiment.

Among the components of the information processing device 600, components that perform the same processing operations as those of the information processing device 300 of the third example embodiment are denoted by the same reference numerals as those in FIG. 7, and detailed description thereof will be omitted.

Among the components of the information processing device 500, components that perform the same processing operations as those of the information processing device 500 of the fifth example embodiment are denoted by the same reference numerals as those in FIG. 13, and detailed description thereof will be omitted.

The information processing device 600 illustrated in FIG. 15 includes a video acquisition unit 201, a detection unit 202, a tracking unit 203, a prediction unit 610, a selection unit 307, and a feature extraction unit 208.

The prediction unit 610 includes an object detection tendency analysis unit 504, a quality prediction unit 505, an environmental factor storage unit 206, and a variation prediction unit 309.

The video acquisition unit 201, the detection unit 202, the tracking unit 203, the environmental factor storage unit 206, and the feature extraction unit 208 are similar to those in the second example embodiment.

The selection unit 307 and the variation prediction unit 309 are similar to those of the third example embodiment.

The object detection tendency analysis unit 504 and the quality prediction unit 505 are similar to those of the fifth example embodiment.

Figure 16:
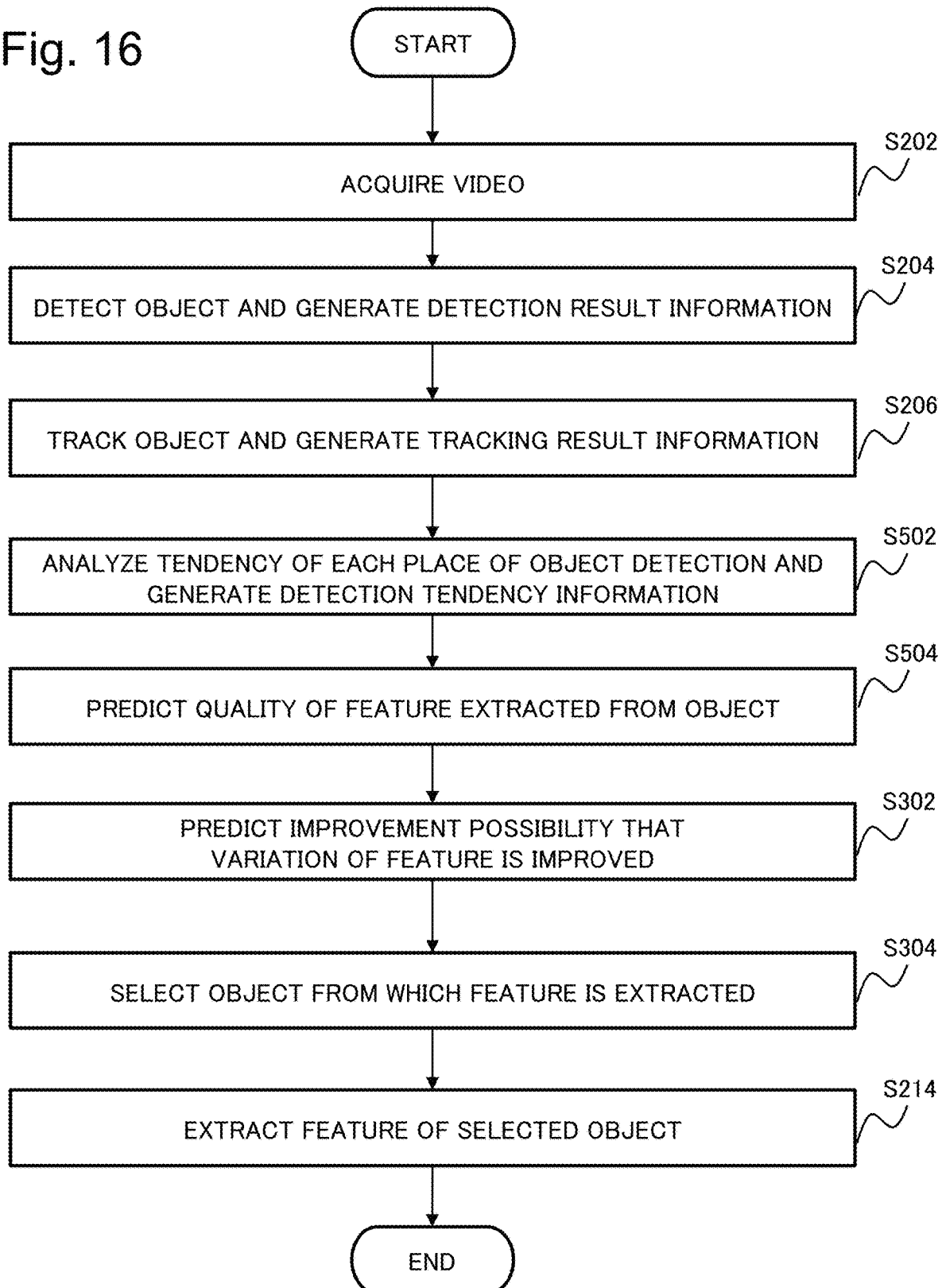
FIG. 16 is a flowchart illustrating processing operation of the information processing device according to the sixth example embodiment.

FIG. 16 is a flowchart illustrating a flow of processing executed by the information processing device 600 according to the sixth example embodiment.

Steps S502 and S504 are similar to those in the fifth example embodiment.

Steps S302 and S304 are similar to those in the third example embodiment.

Step S214 is similar to that in the second example embodiment.

As described above, the information processing device according to the present example embodiment can extract the features suitable for matching. The information processing device according to the present example embodiment can appropriately determine the necessity of extraction of the features by automatically determining the occlusion occurrence tendency of the object by place even in a case where the object exists alone. The information processing device according to the present example embodiment can appropriately determine the necessity of extraction of the features by simultaneously predicting not only the qualities of the features but also the improvement possibility of the variation. Therefore, the information processing device according to the present example embodiment can reduce the calculation cost for extracting the features.

Seventh Example Embodiment

Figure 17:
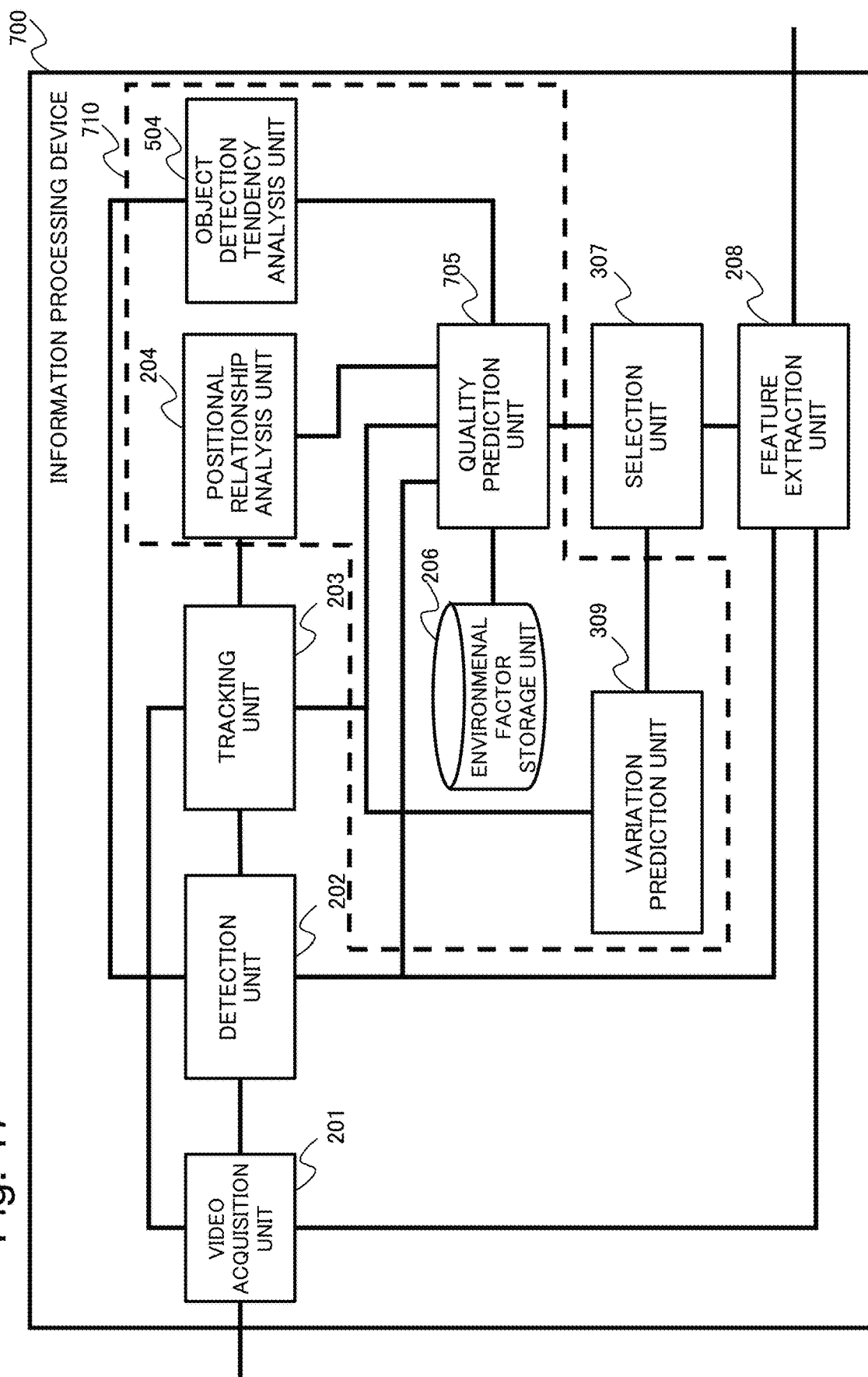
FIG. 17 is a diagram illustrating a configuration of an information processing device according to a seventh example embodiment.

FIG. 17 is a diagram illustrating a configuration of an information processing device 700 according to the present example embodiment.

Among the components of the information processing device 700, components that perform the same processing operations as those of the information processing device 300 of the third example embodiment are denoted by the same reference numerals as those in FIG. 7, and detailed description thereof will be omitted.

Among the components of the information processing device 700, components that perform the same processing operations as those of the information processing device 500 of the fifth example embodiment are denoted by the same reference numerals as those in FIG. 13, and detailed description thereof will be omitted.

The information processing device 700 illustrated in FIG. 17 includes a video acquisition unit 201, a detection unit 202, a tracking unit 203, a prediction unit 710, a selection unit 307, and a feature extraction unit 208.

The prediction unit 710 includes a positional relationship analysis unit 204, an object detection tendency analysis unit 504, a quality prediction unit 705, an environmental factor storage unit 206, and a variation prediction unit 309.

The video acquisition unit 201, the detection unit 202, the tracking unit 203, the positional relationship analysis unit 204, the environmental factor storage unit 206, and the feature extraction unit 208 are similar to those of the second example embodiment.

The selection unit 307 and the variation prediction unit 309 are similar to those of the third example embodiment.

The object detection tendency analysis unit 504 is similar to that of the fifth example embodiment.

The quality prediction unit 705 calculates a quality index by a method similar to that of the quality prediction unit 205, and multiplies the calculated quality index by the multiplier β similarly to the quality prediction unit 505, thereby calculating an overall quality index.

The variation prediction unit 309 is similar to that of the third example embodiment.

In the present example embodiment, the variation prediction unit 309 may be omitted. In that case, the selection unit 307 is replaced with the selection unit 207 of the second example embodiment.

Figure 18:
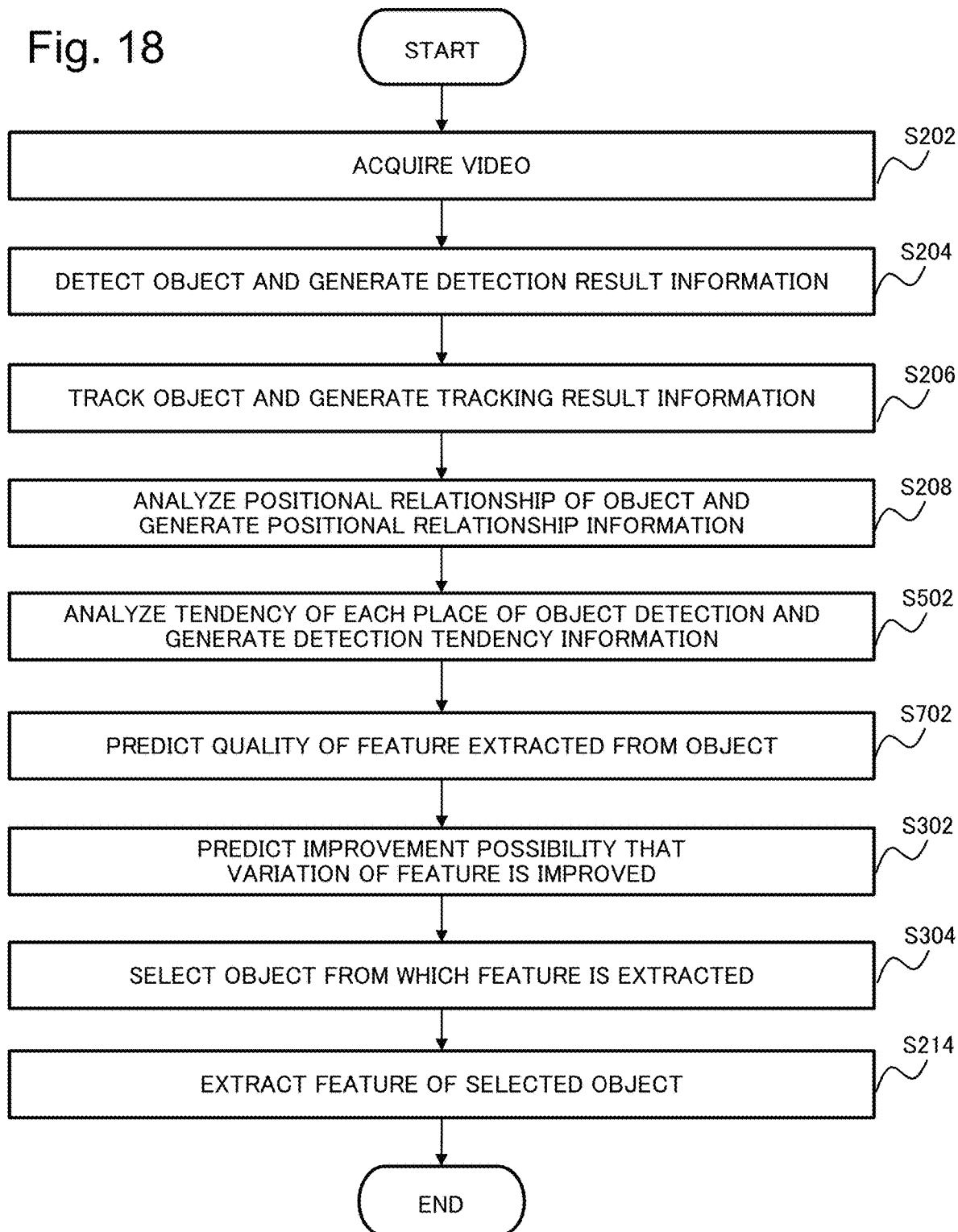
FIG. 18 is a flowchart illustrating processing operation of the information processing device according to the seventh example embodiment.

FIG. 18 is a flowchart illustrating a flow of processing executed by the information processing device 700 according to the seventh example embodiment.

Steps S202, S204, S206, and S208 are similar to those in the second example embodiment.

Step S502 is similar to that in the fifth example embodiment.

In step S702, the quality prediction unit 705 predicts the qualities of the features to be extracted from the object on the basis of the detection result information generated in step S204, the tracking result information generated in step S206, the positional relationship information generated in step S208, and the detection tendency information generated in step S502. When predicting the qualities of the features, the quality prediction unit 705 may refer to the quality index based on the environmental factor stored in the environmental factor storage unit 206.

After step S702 is executed, processing of step S302, step S304, and step S214 is executed as in the third example embodiment.

In the present example embodiment, step S302 may be omitted. In that case, step S204 is executed instead of step S304.

After executing step S214, the information processing device 700 ends the processing.

The information processing device according to the present example embodiment can extract the features suitable for matching. In a case where the quality index based on the degree of occlusion is used, the information processing device according to the present example embodiment can extract the feature s suitable for matching in consideration of overlap between persons or occlusion caused by another obstacle. In a case where the quality index based on the resolution is used, the information processing device according to the present example embodiment can extract the features suitable for matching in consideration of the size of a person on the image. In a case where the quality index based on the motion is used, the information processing device according to the present example embodiment can extract the features suitable for matching in consideration of the possibility of occurrence of a motion blur. In a case where the quality index based on the posture and orientation is used, the information processing device according to the present example embodiment can extract the features suitable for matching in consideration of how much the posture and orientation of the object deviate from the expected posture and orientation. In a case where the quality index based on the environmental factor is used, the information processing device according to the present example embodiment can appropriately predict a decrease in the qualities of the features even in a case where a fixed quality deterioration occurs when the object comes to a particular position. The information processing device according to the present example embodiment switches the quality index based on the environmental factor according to the time of day, thereby being capable of appropriately coping with a case where the qualities of the features to be extracted changes with time. Therefore, in a case where the quality index based on the environmental factor is used, the information processing device according to the present example embodiment can extract features suitable for matching in consideration of a deterioration factor based on a blur, an illumination condition, or the like.

The information processing device according to the present example embodiment can select any quality index to be used, and thus can select an object to be subjected to feature extraction in consideration of only indexes suitable for each scene from among occlusion between objects or resolution, motion, posture, and environmental factor. In this case, the information processing device according to the present example embodiment can perform only processing suitable for each scene, and thus can select an object from which features are to be extracted while efficiently using calculation resources.

The information processing device according to the present example embodiment can suppress the possibility of large variability in the number of feature extraction times among different persons by considering the extraction history of the features. By considering the tracking history of the object, the information processing device according to the present example embodiment can extract the feature suitable for matching by adapting to a case where the object that has passed through time from the previous feature extraction continues to stay at the same place, a case where the state has greatly changed because the object is moving even if the elapsed time from the previous feature extraction is short, or the like. By considering the state change tendency of the object, the information processing device according to the present example embodiment can reflect presence or absence of a change in the features due to a change in the object state according to the place on the variation index, and more appropriate object selection can be performed.

The information processing device according to the present example embodiment can appropriately select an object to be subjected to feature extraction even in a situation where a large number of objects are shown in the image, and can achieve extraction of the features that enable highly accurate matching of the objects as a whole while suppressing the cost required for the feature extraction processing. In particular, the information processing device according to the present example embodiment can appropriately select the object from which the feature is to be extracted even when an overlap occurs between objects due to a large number of objects.

The information processing device according to the present example embodiment can appropriately determine the necessity of extraction of the features by automatically determining the occlusion occurrence tendency of the object by place. The information processing device according to the present example embodiment can appropriately determine the necessity of extraction of the features by simultaneously predicting not only the qualities of the features but also the variation. Therefore, the information processing device according to the present example embodiment can reduce the calculation cost for extracting the features.

Configuration Example of Hardware

A hardware configuration of the information processing device according to each exemplary example embodiment of the present invention will be described below. Each functional configuration unit of the information processing device in each exemplary example embodiment of the present invention may be implemented by hardware (for example, a hard-wired electronic circuit or the like) that implements each functional configuration unit, or may be implemented by a combination of hardware and software (for example, a combination of an electronic circuit and a program that controls the electronic circuit or the like). Hereinafter, a case where each functional configuration unit of the information processing device in each example embodiment of the present invention is achieved by a combination of hardware and software will be further described.

Figure 19:
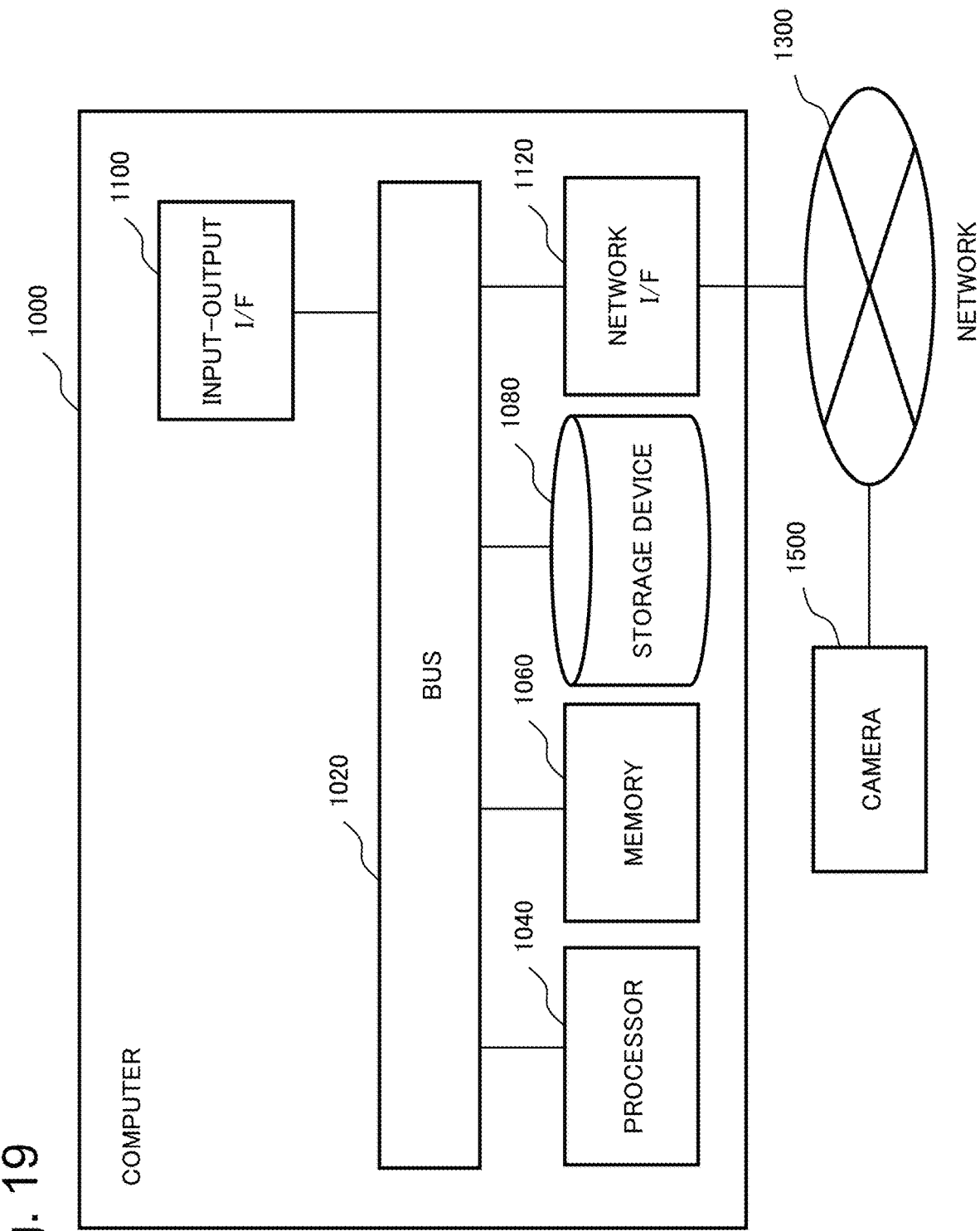
FIG. 19 is a block diagram illustrating an example of hardware constituting each unit of each example embodiment of the present invention.

FIG. 19 is a diagram illustrating a computer 1000, a network 1300, and a camera 1500 for achieving the information processing device according to each example embodiment of the present invention. The computer 1000 is any type of computer. For example, the computer 1000 is a personal computer (PC), a server machine, a tablet terminal, a smartphone, or the like. The computer 1000 may be a dedicated computer designed to achieve the information processing device in each example embodiment of the present invention, or may be a general-purpose computer.

The computer 1000 includes a bus 1020, a processor 1040, a memory 1060, a storage device 1080, an input-output interface 1100, and a network interface 1120. The bus 1020 is a data transmission path for the processor 1040, the memory 1060, the storage device 1080, the input-output interface 1100, and the network interface 1120 to transmit and receive data to and from each other. However, the method of connecting the processor 1040 and the like to each other is not limited to the bus connection. The processor 1040 is various processors such as a central processing unit (CPU), a graphics processing unit (GPU), or a field-programmable gate array (FPGA). The memory 1060 is a main storage device achieved by using a random access memory (RAM) or the like. The storage device 1080 is an auxiliary storage device achieved by using a hard disk, a solid state drive (SSD), a memory card, a read only memory (ROM), or the like.

The input-output interface 1100 is an interface for connecting the computer 1000 and an input-output device. For example, an input device such as a keyboard and an output device such as a display device are connected to the input-output interface 1100.

The network interface 1120 is an interface for connecting the computer 1000 to the network 1300. The network is, for example, a local area network (LAN) or a wide area network (WAN). A method of connecting the network interface 1120 to the network may be a wireless connection or a wired connection.

Furthermore, the camera 1500 is connected to the network 1300, and the computer 1000 and the camera 1500 can communicate data via the network 1300. For example, the video acquisition unit 201 of the information processing device according to each exemplary example embodiment of the present invention acquires a video from the camera 1500.

The storage device 1080 stores program modules that achieve respective means of the information processing device in each example embodiment of the present invention. The processor 1040 reads and executes the program modules in the memory 1060, thereby implementing functions corresponding to the program modules.

Some functions of the information processing device in each example embodiment of the present invention may be executed on the camera 1500 side. That is, a processor, a storage device, and a memory may be stored inside the camera 1500, and all or a part of processing of each means of the information processing device in each example embodiment of the present invention may be executed using these components. For example, the processing of the video acquisition unit 201, the detection unit 202, and the tracking unit 203 may be executed on the camera 1500 side, and other processing may be executed on the computer 1000 side. Alternatively, processing other than the feature extraction unit 208 may be executed on the camera side, and the feature extraction unit 208 may be executed on the computer 1000 side.

The video acquisition unit 201 may be a video recording device such as a hard disk recorder that stores videos captured by a camera. In this case, the video acquisition unit 201 reads and reproduces a video stored in the video recording device, thereby acquiring the video and transmitting the video to the computer 1000 via the network 1300. Then, subsequent processing is executed on the computer 1000 side.

The present invention has been described above as an example applied to the exemplary embodiments described above. However, the technical scope of the present invention is not limited to the scope described in each of the above-described embodiments. It is obvious to those of ordinary skill in the art that various changes or improvements can be made to such embodiments. In such a case, a new embodiment to which such a change or improvement is added can also be included in the technical scope of the present invention. This is apparent from the matters described in the claims.

The form of the above-described example embodiments may be combined or some form may be interchanged. The form of the present invention is not limited only to the above-described example embodiments, and various changes may be made without departing from the gist of the present invention.

The whole or part of the example embodiments disclosed above can be described as, but not limited to, the following supplementary notes.

(Supplementary Note 1)

An information processing device including:
a prediction means for predicting, based on a positional relationship between a plurality of objects detected and tracked in an input video and on an overlap between the plurality of objects, qualities of features to be extracted from the objects;
a selection means for selecting, from among the plurality of objects, only objects or an object for which the qualities of features predicted by the prediction means satisfy a predetermined condition; and
a feature extraction means for extracting features from the object selected by the selection means.

(Supplementary Note 2)

The information processing device according to supplementary note 1, in which
the prediction means predicts the qualities of features to be extracted from the object based on a degree to which the object is hidden by another object.

(Supplementary Note 3)

The information processing device according to supplementary note 1 or 2, in which
the prediction means predicts the qualities of features to be extracted from the object based on at least one of a resolution, an amount of motion, or a posture and an orientation of the object or an environmental factor determined according to a position of the object.

(Supplementary Note 4)

The information processing device according to any one of supplementary notes 1 to 3, further including
a storage means for storing an index indicating how much an environmental factor determined according to a position of the object affects prediction of the qualities of features,
in which the prediction means predicts the qualities of features to be extracted from the object based on the index.

(Supplementary Note 5)

The information processing device according to any one of supplementary notes 1 to 4, in which
the prediction means further predicts an improvement possibility that a variation of the features is improved by extracting the features from an object, and
the selection means selects only objects or an object for which the improvement possibility predicted by the prediction means further satisfies a predetermined condition.

(Supplementary Note 6)

The information processing device according to supplementary note 5, in which
the prediction means predicts the improvement possibility in such a way that the improvement possibility increases as an elapsed time from previous feature extraction is larger.

(Supplementary Note 7)

The information processing device according to supplementary note 5 or 6, in which
the prediction means predicts the improvement possibility in such a way that the improvement possibility increases as a number of times of extraction of the features so far is smaller.

(Supplementary Note 8)

The information processing device according to any one of supplementary notes 5 to 7, in which
the prediction means predicts the improvement possibility in such a way that the improvement possibility increases as a movement amount of an object is larger.

(Supplementary Note 9)

The information processing device according to any one of supplementary notes 5 to 8, in which
the prediction means predicts the improvement possibility further based on a category determined according to a state of an object.

(Supplementary Note 10)

The information processing device according to any one of supplementary notes 5 to 9, in which
the prediction means predicts the improvement possibility further based on a tendency of a state change of an object determined according to a position of the object.

(Supplementary Note 11)

An information processing device including:
a prediction means for predicting, from objects detected and tracked in an input video, qualities of features to be extracted from the objects and an improvement possibility that a variation of the features is improved by extracting the features from the objects based on at least one of a resolution, an amount of motion, or a posture and an orientation of the objects or an environmental factor determined according to positions of the objects;
a selection means for selecting, from among the objects, only objects or an object for which the qualities of features and the improvement possibility predicted by the prediction means satisfy a predetermined condition; and
a feature extraction means for extracting features from the object selected by the selection means.

(Supplementary Note 12)

An information processing device including:
a prediction means for predicting, from objects detected and tracked in an input video, qualities of features to be extracted from the objects based on at least one of a resolution, an amount of motion, or a posture and an orientation of the objects or an environmental factor determined according to positions of the objects and a degree of occlusion of the objects depending on the positions of the objects;
a selection means for selecting, from among the objects, only objects or an object for which the qualities of features predicted by the prediction means satisfy a predetermined condition; and
a feature extraction means for extracting features from the object selected by the selection means.

(Supplementary Note 13)

The information processing device according to supplementary note 12, in which
the prediction means further predicts an improvement possibility that a variation of the features is improved by extracting the features from an object, and
the selection means selects only objects or an object for which the improvement possibility predicted by the prediction means further satisfies a predetermined condition.

(Supplementary Note 14)

The information processing device according to supplementary note 12 or supplementary note 13, in which
the prediction means further predicts qualities of features to be extracted from the object based on a positional relationship between a plurality of objects detected and tracked in an input video and an overlap between the plurality of objects.

(Supplementary Note 15)

An information processing method including:
predicting, based on a positional relationship between a plurality of objects detected and tracked in an input video and on an overlap between the plurality of objects, qualities of features to be extracted from the objects;
selecting, from among the plurality of objects, only objects or an object for which the qualities of features satisfy a predetermined condition; and
extracting features from the selected object.

(Supplementary Note 16)

An information processing method including:
predicting, from objects detected and tracked in an input video, qualities of features to be extracted from the objects and an improvement possibility that a variation of the features is improved by extracting the features from the objects based on at least one of a resolution, an amount of motion, or a posture and an orientation of the objects or an environmental factor determined according to positions of the objects;

selecting, from among the objects, only objects or an object for which the qualities of features and the improvement possibility satisfy a predetermined condition; and extracting features from the selected object.

(Supplementary Note 17)

An information processing method including:

predicting, from objects detected and tracked in an input video, qualities of features to be extracted from the objects based on at least one of a resolution, an amount of motion, or a posture and an orientation of the objects or an environmental factor determined according to positions of the objects and a degree of occlusion of the objects depending on the positions of the objects;

selecting, from among the objects, only objects or an object for which the qualities of features satisfy a predetermined condition; and extracting features from the selected object.

(Supplementary Note 18)

A program recording medium recording an information processing program for causing a computer to execute:

a prediction processing of predicting, based on a positional relationship between a plurality of objects detected and tracked in an input video and on an overlap between the plurality of objects, qualities of features to be extracted from the objects;

a selection processing of selecting, from among the plurality of objects, only objects or an object for which the qualities of features predicted by the prediction processing satisfy a predetermined condition; and a feature extraction processing of extracting features from the object selected by the selection processing.

(Supplementary Note 19)

A program recording medium recording an information processing program for causing a computer to execute:

a prediction processing of predicting, from objects detected and tracked in an input video, qualities of features to be extracted from the objects and an improvement possibility that a variation of the features is improved by extracting the features from the objects based on at least one of a resolution, an amount of motion, or a posture and an orientation of the objects or an environmental factor determined according to positions of the objects;

a selection processing of selecting, from among the objects, only objects or an object for which the qualities of features and the improvement possibility predicted by the prediction processing satisfy a predetermined condition; and a feature extraction processing of extracting features from the object selected by the selection processing.

(Supplementary Note 20)

A program recording medium recording an information processing program for causing a computer to execute:

a prediction processing of predicting, from objects detected and tracked in an input video, qualities of features to be extracted from the objects based on at least one of a resolution, an amount of motion, or a posture and an orientation of the objects or an environmental factor determined according to positions of the objects and a degree of occlusion of the objects depending on the positions of the objects;

a selection processing of selecting, from among the objects, only objects or an object for which the qualities of features predicted by the prediction processing satisfy a predetermined condition; and a feature extraction processing of extracting features from the object selected by the selection processing.

INDUSTRIAL APPLICABILITY

By using an information processing device of the present invention, even in a case where it takes time to extract features of an object, it is possible to perform object matching with high accuracy as a whole. Thus, it can be used for object tracking between cameras or the like in video surveillance or the like.

REFERENCE SIGNS LIST

100 Information processing device
101 Prediction unit
102 Selection unit
103 Feature extraction unit
200 Information processing device
201 Video acquisition unit
202 Detection unit
203 Tracking unit
204 Positional relationship analysis unit
205 Quality prediction unit
206 Environmental factor storage unit
207 Selection unit
208 Feature extraction unit
210 Prediction unit
300 Information processing device
307 Selection unit
309 Variation prediction unit
310 Prediction unit
311 Variation index calculation unit
312 Extraction history storage unit
313 Tracking history storage unit
314 Object state change tendency storage unit
400 Information processing device
405 Quality prediction unit
410 Prediction unit
500 Information processing device
504 Object detection tendency analysis unit
505 Quality prediction unit
510 Prediction unit
600 Information processing device
610 Prediction unit
700 Information processing device
705 Quality prediction unit
710 Prediction unit
1000 Computer
1020 Bus
1040 Processor
1060 Memory
1080 Storage device
1100 Input-output interface
1120 Network interface
1300 Network
1500 Camera

The invention claimed is:

1. An information processing device comprising:
a memory storing instructions; and
a processor connected to the memory and configured to execute the instructions to:

acquire a video;

detect an object from a frame included in the video;

generate detection result information including information for specifying the frame in which the detected object is detected and information of the detected object;

update a tracking result information associating the detected object included in the detection result information with a tracking target object;

predict qualities of features to be extracted based on a positional relationship between a plurality of objects and an overlap between the plurality of the objects;

select an object for which the qualities of the predicted features satisfy a predetermined condition; and extract a feature from the selected object.

2. The information processing device according to claim 1, wherein the processor is configured to execute the instructions to predict the qualities of features to be extracted based on an object hidden degree.

3. The information processing device according to claim 1, wherein the processor is configured to execute the instructions to predict the qualities of features to be extracted based on at least one of an object resolution, an amount of object motion, or an object posture and an object orientation or an environmental factor determined according to an object position.

4. The information processing device according to claim 1, wherein the processor is configured to execute the instructions to predict the qualities of features to be extracted based on an index indicating how much an environmental factor determined according to an object position of affects prediction of the qualities of features.

5. The information processing device according to claim 1, wherein the processor is configured to execute the instructions to predict an improvement possibility that a variation of the features is improved by extracting the features, and select the object for which the predicted improvement possibility further satisfies a predetermined condition.

6. The information processing device according to claim 5, wherein the processor is configured to execute the instructions to predict the improvement possibility in such a way that the improvement possibility increases as an elapsed time from previous feature extraction is larger.

7. The information processing device according to claim 5, wherein the processor is configured to execute the instructions to predict the improvement possibility in such a way that the improvement possibility increases as a number of times of extraction of the features thus far is smaller.

8. The information processing device according to claim 5, wherein the processor is configured to execute the instructions to predict the improvement possibility in such a way that the improvement possibility increases as an object movement amount is larger.

9. The information processing device according to claim 5, wherein the processor is configured to execute the instructions to predict the improvement possibility further based on a category determined according to an object state.

10. The information processing device according to claim 5, wherein the processor is configured to execute the instructions to predict the improvement possibility further based on a tendency of an object state change determined according to an object position.

* * * * *